(12) United States Patent
Suzuki

(10) Patent No.: US 7,397,841 B2
(45) Date of Patent: Jul. 8, 2008

(54) WIDE BAND COMMUNICATION RECEPTION APPARATUS AND METHOD

(75) Inventor: Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 784 days.

(21) Appl. No.: 10/737,859

(22) Filed: Dec. 18, 2003

(65) Prior Publication Data

US 2004/0179582 A1    Sep. 16, 2004

(30) Foreign Application Priority Data

Jan. 15, 2003    (JP)    ............................. 2003-006972

(51) Int. Cl.
*H04B 1/69* (2006.01)
(52) U.S. Cl. .................................... 375/147
(58) Field of Classification Search ................ 375/147, 375/130, 343, 359; 455/188.1, 63.3
See application file for complete search history.

(56) References Cited

U.S. PATENT DOCUMENTS

| 2003/0206575 | A1* | 11/2003 | Bertrand et al. | ............. | 375/147 |
| 2004/0013190 | A1* | 1/2004 | Jayaraman et al. | ........... | 375/233 |
| 2004/0125863 | A1* | 7/2004 | Ghosh | ........................ | 375/147 |

FOREIGN PATENT DOCUMENTS

| JP | 59-050646 | 3/1984 |
| JP | 02-238750 | 9/1990 |
| JP | 06-006324 | 1/1994 |
| JP | 06-205055 | 7/1994 |
| JP | 07-095189 | 4/1995 |
| JP | 07-177057 | 7/1995 |
| JP | 10-041854 | 2/1998 |
| JP | 10-173630 | 6/1998 |
| JP | 10-313289 | 11/1998 |
| JP | 11-008568 | 1/1999 |
| JP | 2000-049663 | 2/2000 |
| JP | 2000-101474 | 4/2000 |
| JP | 2002-084577 | 3/2002 |
| JP | 2002-252865 | 9/2002 |

OTHER PUBLICATIONS

Jeffrey R. Foerster, "The Performance of a direct-sequence spread ultra-wideband system in the presence of multipath, narrowband interference, and multiuser interference", IEEE Conference on Ultra Wideband Systems and Technologies, 2002, 87-91.

* cited by examiner

*Primary Examiner*—Khai Tran
(74) *Attorney, Agent, or Firm*—Oblon, Spivak, McClelland, Maier & Neustadt, P.C.

(57) ABSTRACT

There is provided a communication apparatus compliant with ultra wide band communication systems for improving resistance to interfering waves in combination with DS-SS (direct sequence spread spectrum). There is provided a training section based on short code spread with the same pattern repeated for each symbol length. Actual communication itself is preceded by coherent channel measurement of a transmission channel by using the training section to specify a length of the short code to be a measurement period and using N cycles of a carrier as a time resolution for measurement. A chip timing is controlled at the time resolution for measurement. At all points given by a time resolution for a measurement period, a measured value is obtained by using the short code to despread A/D-converted values from an input signal based on the chip timing.

24 Claims, 39 Drawing Sheets

F I G. 2 1
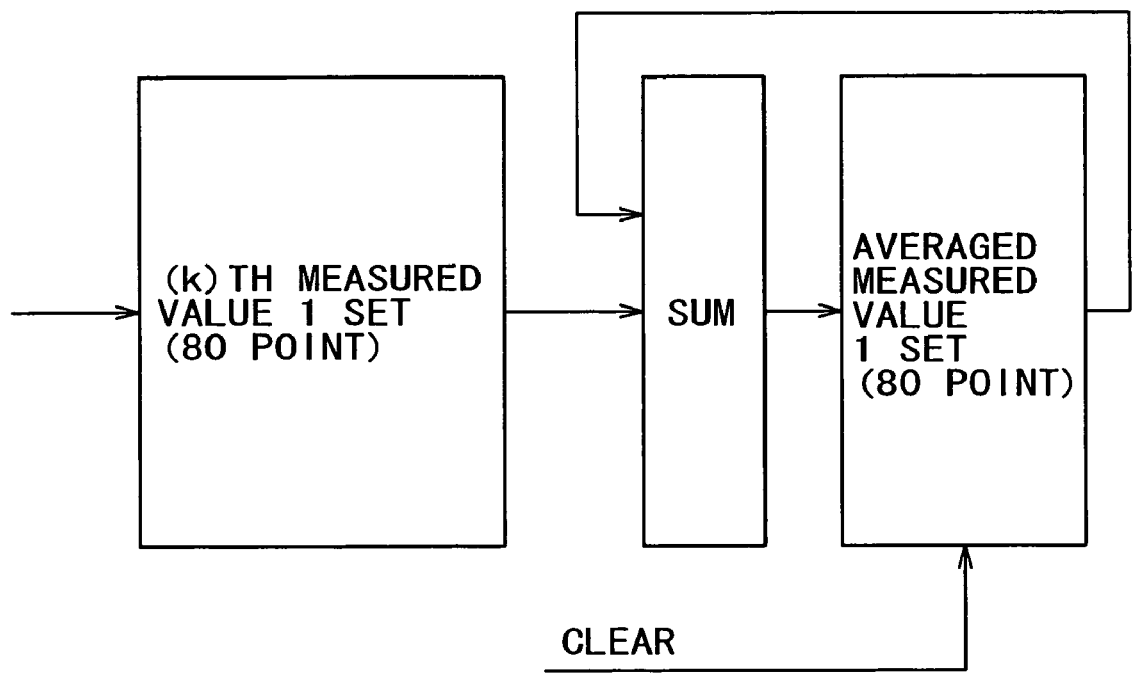

F I G. 2 4
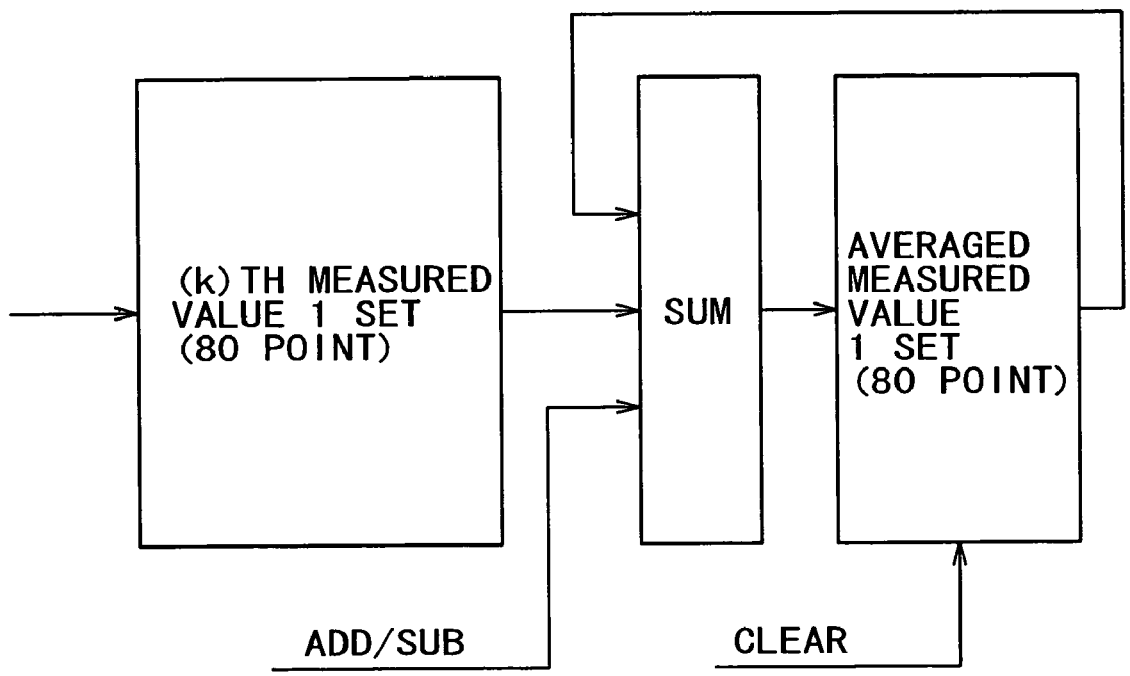

F I G. 2 6
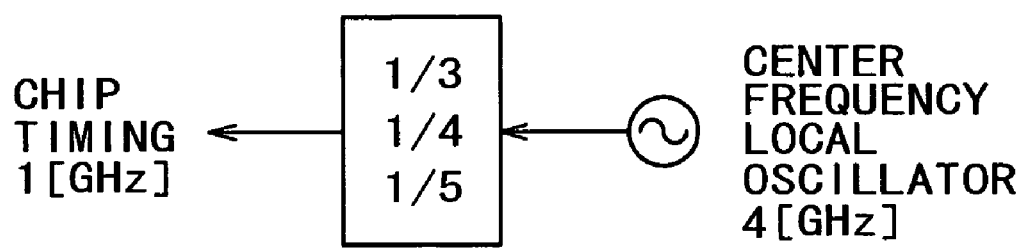

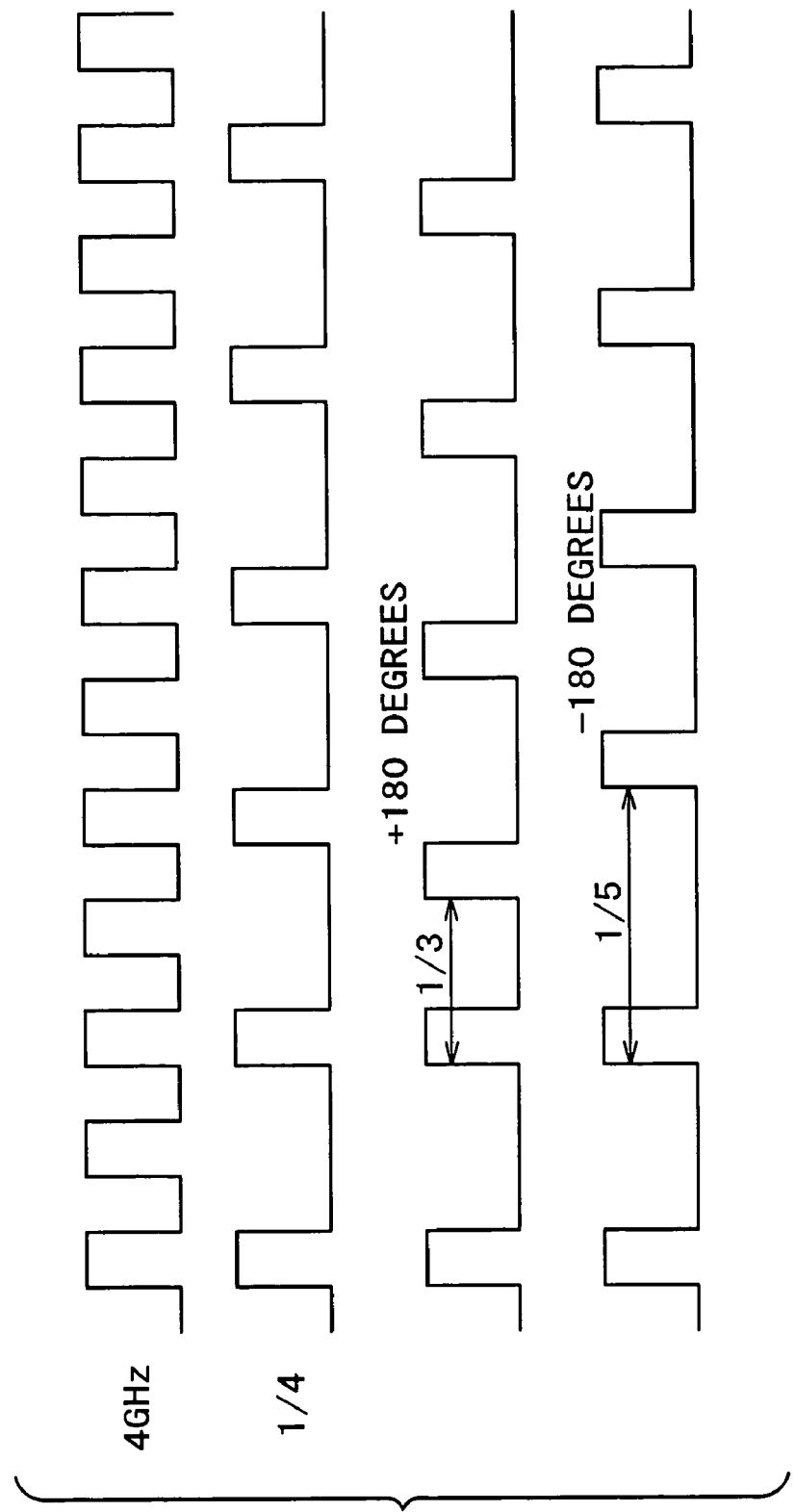

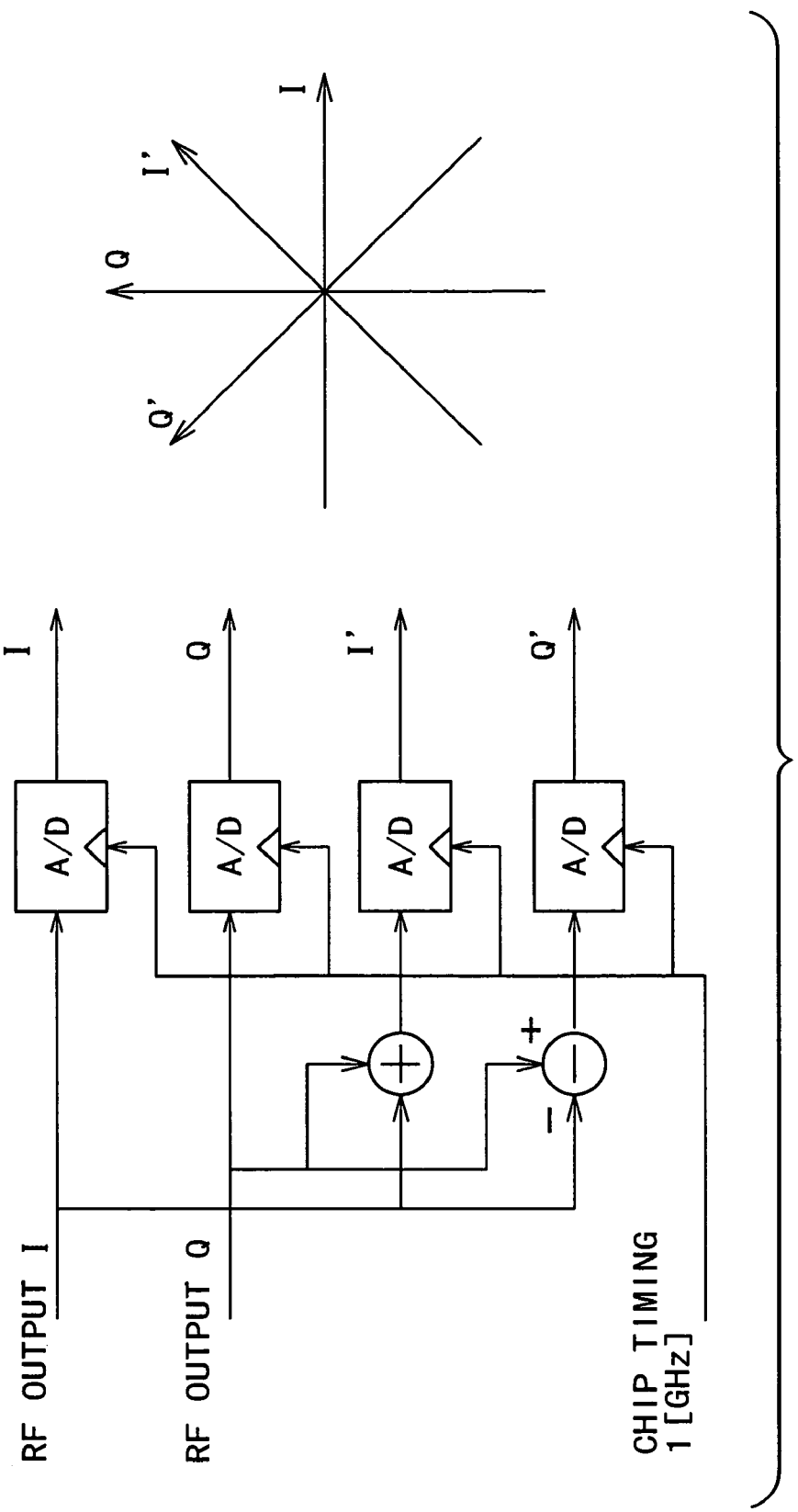

WIDE BAND COMMUNICATION RECEPTION APPARATUS AND METHOD

BACKGROUND OF THE INVENTION

The present invention relates to a communication apparatus and a communication method compliant with ultra wide band (UWB) communication systems for using an impulse signal sequence having a very short cycle of approximately several hundred picoseconds to configure an information signal and transmitting and receiving the signal sequence. Particularly, the present invention relates to a communication apparatus and a communication method for transmission and reception using a pulse that solves spectrum problems in an ultra wide band (UWB) communication system.

More specifically, the present invention relates to a communication apparatus and a communication method compliant with ultra wide band communication systems for improving resistance to interfering waves in combination with DS-SS (direct sequence spread spectrum).

DESCRIPTION OF RELATED ART

A plurality of computers can be connected to configure a LAN (Local Area Network). Using the LAN, it is possible to share information such as files and data or peripheral devices such as printers. Further, the LAN makes it possible to exchange information by transferring e-mail and data contents.

Recently, particular attention has been paid to a wireless LAN. The use of the wireless LAN can eliminate most hardware cables in work spaces such as offices. This makes it possible to relatively easily move communication terminals such as personal computers (PCs). Further, wireless LAN systems have improved processing speeds and reduced costs, thus remarkably increasing the demand. Particularly, the introduction of a personal area network PAN is examined for information communication by constructing a small-scale wireless network between a plurality of electronic devices available very near to users.

A recent trend is to put SS (Spread Spectrum) based wireless LAN (Local Area Network) systems to practical use. There are proposed SS based UWB (Ultra Wide Band) transmission systems for PAN applications and the like.

The SS systems include the DS (Direct Spread) system. According to this system, the transmission side multiplies an information signal by a random code sequence called a PN (Pseudo Noise) code to spread a dedicated band for transmission. The reception side multiplies the received spread information signal by the PN code to reversely spread the information signal for reproduction.

The UWB transmission system includes two types: DS-UWB and impulse-UWB. The DS-UWB system maximizes spread speeds of DS information signals. The impulse-UWB system configures an information signal using an impulse signal sequence having a very short cycle of approximately several hundred picoseconds to send and receive the signal sequence.

The DS-UWB can control spectra using PN code speeds, but needs to fast operate logic circuits in units of GHz. The power consumption increases dramatically. On the other hand, the impulse-UWB system can be configured in combination with a pulse generator and a low-speed logic circuit. There is an advantage of decreasing the current consumption. However, the pulse generator makes it difficult to control spectra.

Both systems can implement high-speed data transmission by spreading signals to an ultra-high frequency band, e.g., between 3 and 10 GHz for transmission and reception. The dedicated bandwidth is expressed in units of GHz so that a value approximate to 1 results from division of the dedicated bandwidth by a center frequency (e.g., 1 to 10 GHz). The dedicated bandwidth is ultrawide compared to bandwidths normally used for wireless LANs based on the W-CDMA or cdma2000 system, and the SS (Spread Spectrum) or OFDM (Orthogonal Frequency Division Multiplexing) system.

Conventionally, there has been used a Gaussian monocycle pulse as an impulse signal for UWB transmission. Let us compare a Gaussian monocycle pulse with a square wave monocycle pulse to examine requirements for the device linearity in pulse generation. An example here uses the square wave monocycle pulse of Tp=200 [ps] and 1 [V]. The Gaussian monocycle pulse follows the equation below. In the equation, constants such as 3.16 and 3.3 are found to provide a spectrum equivalent to the square wave monocycle pulse.

$$x(t) = 3.16 \frac{t}{T_P} \exp\left[\left(3.3 \frac{t}{T_P}\right)^2\right] \quad \langle \text{Eq. 1} \rangle$$

FIG. 1 shows time waveforms. FIG. 2 shows a comparison between frequency characteristics of power spectrum densities for these monocycle pulses. The power spectrum density is expressed as [W/Hz=J] when the pulse of the indicated voltage is transmitted at one pulse per second and is driven under the condition of 50 ohms.

As can be seen from FIG. 2, a pulse of 100 MHz per second will yield the power density 80 dB higher than this value. The pulse peak here indicates a power density of approximately −211 dBJ. Consequently, the pulse of 100 MHZ per second yields approximately −131.3 [dBW/Hz=dBJ] just equivalent to the FCC specification of −41.3 [dBm/MHz].

Therefore, the following can be concluded.

(1) The Gaussian monocycle pulse is almost the same as the square wave monocycle pulse in the transmission band.

(2) The Gaussian monocycle pulse generates a higher peak voltage than the square wave monocycle pulse, requires the linearity, and makes processing difficult including power amplification.

The conventional UWB communication uses monocycle pulses. FIG. 3 shows the frequency characteristics of power spectrum densities in FIG. 2 in terms of antilogarithms instead of decibels. Though there is no special need for using antilogarithms, the linear representation of energy provides many intuitive benefits.

Here, the spectrum has the following two requirements.

(1) The FCC specifications for spectrum masks disable radiation of 3 GHz or less.

(2) The band ranging from 4.9 to 5.3 GHz contains a 5 GHz wireless LAN that should be avoided.

The following can be observed from the linearly displayed power spectrum.

(1) If the above-mentioned requirements are not satisfied, only about half of the power [3 dB] is transmitted.

(2) A pulse waveform is expected to be disturbed. The receiving side allows just another half of the energy to pass through a matched filter.

(3) There is caused a loss of 6 dB or more in total.

FIG. 4 shows a configuration example (conventional example) of a receiver in the ultrawide band communication system. The configuration of the receiver in FIG. 4 is similar to that of a DS-SS (direct sequence spread spectrum) receiver.

The example in FIG. 4 assumes that the VCO oscillates at the same frequency as the pulse frequency.

The receiver follows the VCO timing and generates a pulse sequence having data all set to zeros. Using this, the receiver generates three waveforms each deviated for half of pulse width Tp, i.e., Tp/2, and multiplies them by a received signal.

When a pulse position is detected, the VCO frequency is intentionally deviated. As a result, a pulse timing match will occur at a certain time point to follow (Sliding Correlation).

When a pulse timing match occurs, the energy increases as a result of the multiplication, making it possible to detect the pulse position.

When the pulse position is detected, the intentionally deviated VCO frequency is returned to the correct frequency. At the same time, a tracking operation takes place in order to maintain this timing.

The received signal is multiplied by the waveforms deviated $\pm T_p/2$ against the center (puncture) to find energies. Differences are used to detect positive and negative values corresponding to positive and negative pulse position errors. These values are supplied to loop filters and are used as control voltages for the pulse position tracking.

However, the receiver configured as shown in FIG. 4 needs to divide a signal path into three and use three multiplication-oriented circuits, thus complicating the circuitry.

Further, the receiver needs to change frequencies for search and tracking operations. The time needed for this changeover prolongs the time for synchronization establishment.

Pulse positions need to be correctly detected under a noise environment. For this purpose, it is necessary to detect that the energy increases more than once. A slight frequency is selected to be deviated intentionally. After the energy increases more than once, resulting values are averaged. Thereafter, pulse positions needed to be detected. Consequently, the time to establish the synchronization becomes lengthy.

Analog circuits are used to configure systems for frequency deviation and tracking. However, analog circuits are often complex and are subject to variance, making it difficult to ensure stable operations.

Energy values are used for the pulse position detection and tracking, thus degrading the S/N ratio and characteristics.

[Non-Patent Document]
NIKKEI ELECTRONICS Mar. 11, 2002, pp. 55-66
"Ultra Wideband: Revolutionary Wireless Technology is Born"

SUMMARY OF THE INVENTION

It is an object of the present invention to provide an excellent communication apparatus and communication method capable of transmission and reception using a pulse that solves spectrum problems in an ultra wide band communication system.

Particularly, the present invention proposes a high-speed method of measuring transmission channels, i.e., a high-speed method of detecting pulse positions, amplitudes, and phases in an ultra wide band communication system combined with the DS-SS (direct sequence spread spectrum) for improving resistance to interfering waves.

The present invention has been made in consideration of the foregoing. According to a first aspect of the present invention, there is provided a communication system performing ultra wide band communication comprising:

a spread processing section which applies direct sequence spread spectrum to transmission data; and an RF transmission processing section which uses the transmission band center as a carrier frequency and generates a signal comprising a pulse obtained by using the carrier frequency to modulate a baseband pulse generated at a chip rate equivalent to an integral division of the carrier frequency, wherein transmission of the transmission data is preceded by transmission of a training pattern comprising a short code which repeats the same pattern for each symbol length.

According to a second aspect of the present invention, there is provided a communication system performing ultra wide band communication comprising:

an RF reception processing section which uses the transmission band center as a carrier frequency and receives an input signal comprising a pulse obtained by using the carrier frequency to modulate a baseband pulse generated at a chip rate equivalent to an integral division of the carrier frequency; and a coherent channel measuring section which provides a training section based on short code spread with the same pattern repeated for each symbol length and performs coherent channel measurement of a transmission channel by using the training section to specify a length of the short code to be a measurement period and using N cycles of a carrier as a time resolution for measurement.

Here, it is possible to control a chip timing at the time resolution for measurement and, at all points given by a time resolution for a measurement period, obtain a measured value by using the short code to despread A/D-converted values from an input signal based on the chip timing.

The measurement can be accelerated by using a plurality of despread blocks and providing them with respective appropriate despread timings.

The training section's cycle should have a length needed to measure all points. A plurality of measurement processes is performed to obtain a measured value by using the short code to despread A/D-converted values from an input signal based on the chip timing. The measured values are added cumulatively or intermittently at each point on a complex-number basis to take an average. In this manner, the measurement's S/N ratio can be improved. There is detected a pulse position at which a largest energy is found out of the measured values cumulatively or intermittently added at respective points on a complex-number basis. A reception symbol is demodulated at a detected pulse position. The demodulation result is correlated with a symbol pattern in the training section to detect a symbol position in the training section. A final coherent channel measurement value is determined by removing an effect of the symbol pattern of the training section from a measured value at each point.

The communication system according to the present invention can provide faster transmission channel estimation than a technique using the sliding correlation.

The fast transmission channel estimation can also fast detect symbol or pulse positions. This enables operations such as CSMA equivalent to the carrier sense that is originally difficult for the UWB communication to implement. It becomes possible to use multiple access systems such as CSMA.

For example, the communication system according to the present invention always stores the specified number of measured values for the specified number of points in the past. It is possible to acquire the most recent measured values as needed by means of moving average for the specified number of measured values. That operation makes it possible to detect any signal whose location is unknown. The operation can be used as the coherent channel measurement in multiple access systems such as CSMA for bursty communication at random times.

Further, it is possible to grasp a multipath situation using a result of the coherent channel measurement according to the present invention and to obtain parameters needed to RAKE-receive signals via a plurality of paths based on the multipath situation. For example, paths with different chip phases cannot be RAKE-combined. Accordingly, it just needs to obtain a multipath timing based on the result of measuring the transmission channels and combine only paths with the same chip phase. The RAKE reception makes it possible to effectively combine chronologically dispersed signal powers into an intended result. Since the direct sequence spread spectrum provides an effect of disassembling the time by means of the despread, this effect is used to combine signals along separated paths by aligning the time and the phase.

Moreover, the SINR can be estimated based on the final measured value from the coherent channel measurement according to the present invention. The estimated SINR can be used to realize the highly accurate link adaptation. The direct sequence spread spectrum communication can realize various bit rates by changing spread rates. If a noise level or an interference level is smaller than the signal level, the spread rate can be decreased to increase the bit rate. Otherwise, the spread rate can be increased to decrease the bit rate.

The present invention changes a carrier division ratio for obtaining chip timings to correct received pulse positions. In this manner, a stable reception circuit can be configured. Simply correcting the carrier phase just needs to digitally correct the phase of the despread I/Q signal. Since the pulse position is deviated, analog correction is needed, i.e., correcting a received pulse position by changing carrier division ratios. The carrier synchronizes with the chip timing. Therefore, tracking the carrier phase simultaneously tracks the chip timing.

In addition to I and Q components that are basically obtained through the quadrature detection of a received signal, the present invention adds and subtracts outputs from the I and Q components in an analog fashion, applies a 45-degree phase rotation to the results, and A/D-converts them. In this manner, even an A/D converter having a small number of bits is capable of excellent phase tracking, improving a demodulation result.

In particular, the A/D conversion for a small number of bits may be subject to insufficient resolution for the transmission at a decreased spread rate and an increased bit rate. Basically, the quadrature detection is performed for the received signal to obtain the I and Q components that are then A/D-converted at the chip timing to be used as input signals. Further, it may be preferable to mutually add and subtract the I and Q components in an analog fashion, apply a 45-degree rotation, and then perform the A/D conversion to create signals I' and Q'. These may be used as input signals. As can be seen from a result of A/D conversion for four signals, the 1-bit A/D converter can be used for quantization in eight phase directions. Even a high-speed transmission can increase the phase correction resolution.

While the training pattern comprises a short code repeated for the specified number of symbols, it may be preferable to use a training pattern suffixed by its reverse to provide a double training length. In this case, it just needs to perform a plurality of measurement processes to obtain a measured value by using the short code to despread A/D converted values from an input signal based on the chip timing and alternately add or subtract the measured value at each point.

The FCC rule requests that the radiated spectrum power be measured at 1 MHz and that a power density be smoothed at any measurement point. When the training length is doubled, almost flat spectrums can be measured at every 1 MHz, making it possible to realize radiation of a maximum power within the range satisfying the FCC rule. On the other hand, it is obvious that shortening the cycle makes the measurement (or synchronization detection) easier. Based on this principle, however, the total power needs to be dropped for satisfying the FCC rule.

These and other objects and novel features of the invention may be readily ascertained by referring to the following description and appended drawings.

BRIEF DESCRIPTION OF THE DRAWINGS

FIG. 21 shows a circuit configuration for averaging a measured result from the coherent channel measuring section;

FIG. 24 shows a circuit configuration for averaging measurement results by alternately adding or subtracting measured values;

FIG. 26 shows a functional configuration for forward and backward shifting a chip timing in units of 250 picoseconds;

FIG. 27 shows how to resume a phase ±360 degrees by once changing a 4 GHz ¼ divider to a ⅓ or ⅕ divider;

FIG. 40 exemplifies a circuit configuration of an A/D converter to detect eight phases.

DETAILED DESCRIPTION OF THE PREFERRED EMBODIMENTS

Embodiments of the present invention will be described in further detail with reference to the accompanying drawings.

A. Effects of the Direct Sequence Spread Spectrum

A UWB-based PAN (Personal Area Network) is not suited to centralized management of frequency resources using a base station, for example. From the viewpoint of reusing spatial frequencies, it is considered to be preferable that maldistributed wireless stations grasp the use of resources in nearby wireless stations and use the frequencies under distributed control. This is especially required of the UWB because it uses an ultra-wide band as mentioned above and cannot reuse spatial frequencies by means of frequency division.

Even if adjacent communications use the same frequency, the use of the spectrum spread can set the C/I needed for enabling normal communication to a level lower than 0 dB. That is to say, if a user detects another user's signal at the same level as that of his or her own, the former is still capable of communication. This is especially easily available to the UWB because it occupies a much wider bandwidth than the required bit rate.

The UWB's bandwidth depends on a pulse width independently of a pulse rate. While a wide bandwidth due to a narrow pulse width signifies a kind of spectrum spread, this is not discussed here for the following reason. In this case, the resistance to interfering waves takes effect if pulse positions differ occasionally. The resistance to interfering waves is not expected if pulse positions match by chance. In other words, it is a matter of chance. Therefore, it is preferable to perform the effective spectrum spread based on direct spread in addition to the spread based on a small pulse width.

The following proposes the coherent channel measurement method and the like in the ultra wide band communication system combined with the DS-SS (direct sequence spread spectrum) for improving the resistance to interfering waves.

Figure 1:
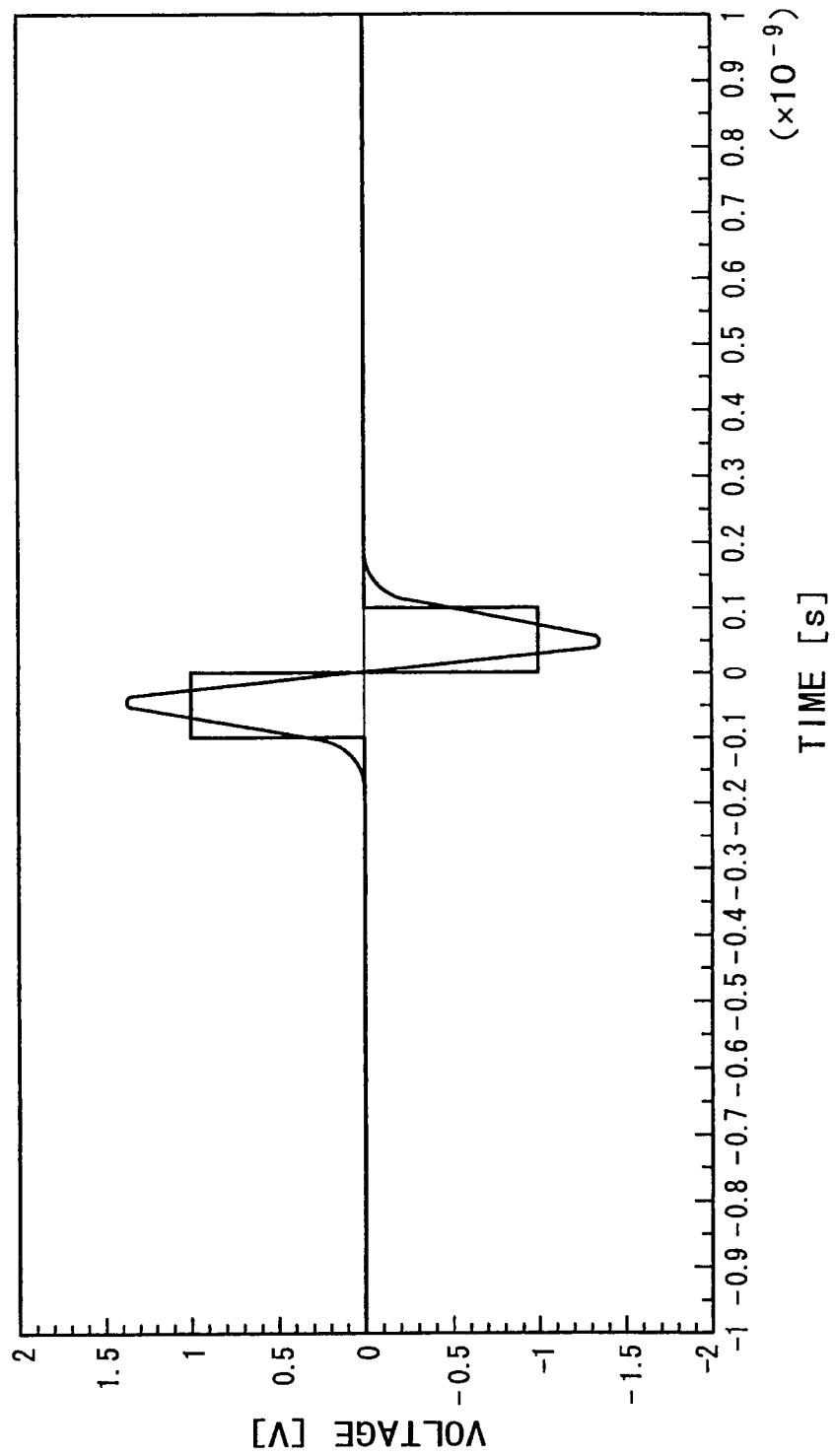
FIG. 1 shows time waveforms for a Gaussian monocycle pulse.
Figure 2:
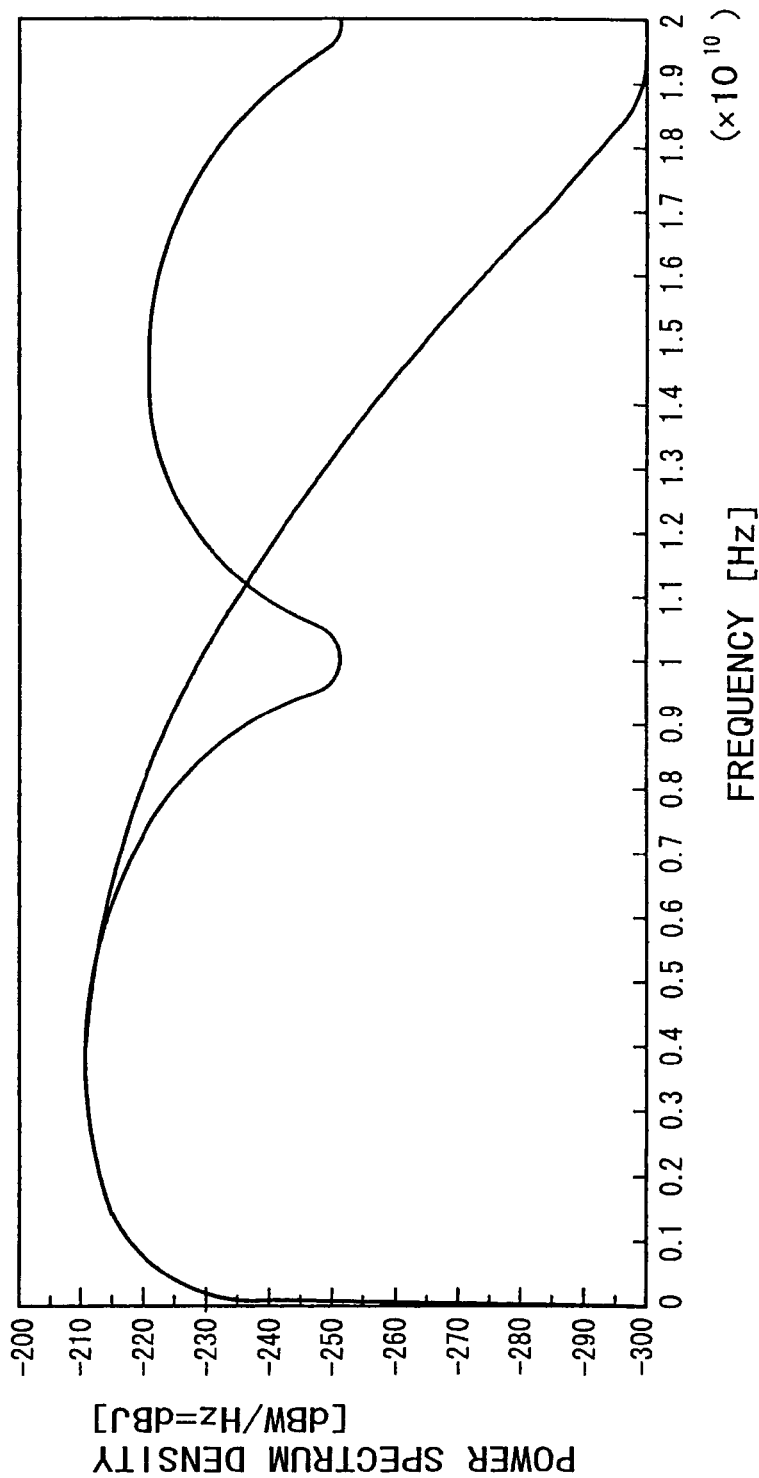
FIG. 2 shows frequency characteristics of power spectrum densities for the Gaussian monocycle pulse and the square wave monocycle pulse.
Figure 3:
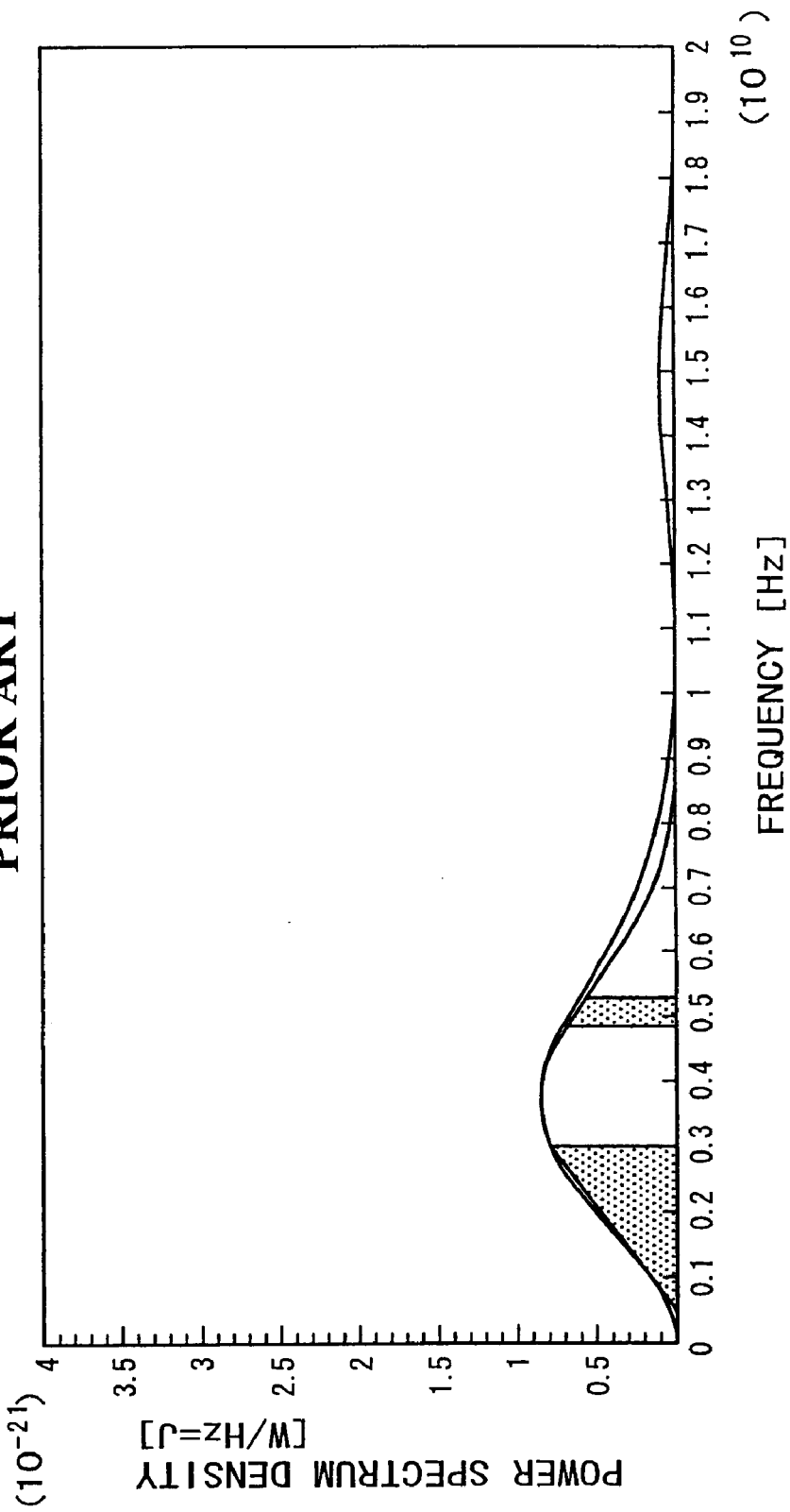
FIG. 3 shows frequency characteristics of power spectrum densities for the Gaussian monocycle pulse and the square wave monocycle pulse.
Figure 4:
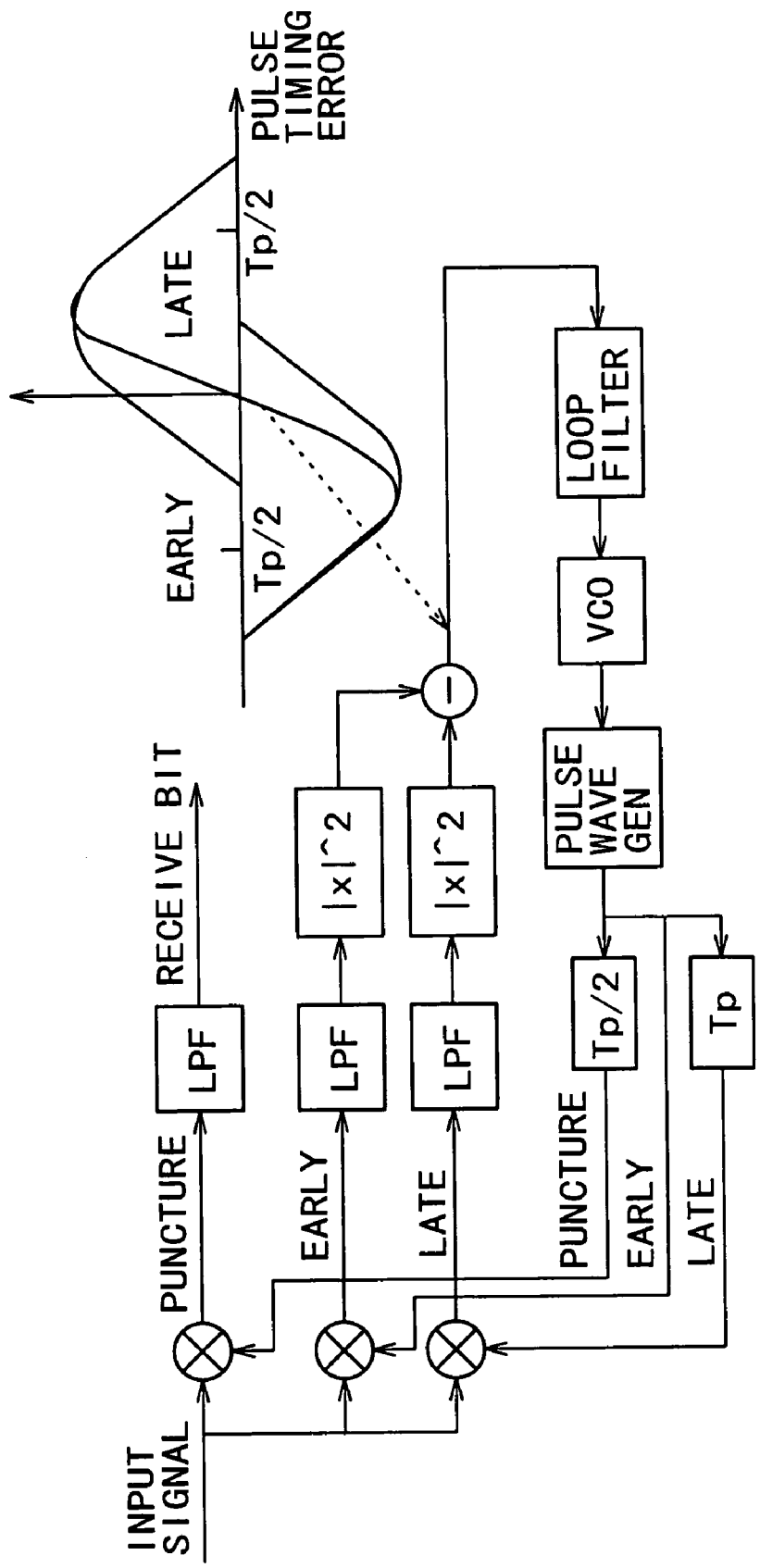
FIG. 4 shows a configuration example (conventional example) of a receiver in the ultra wide band communication system.
Figure 5:
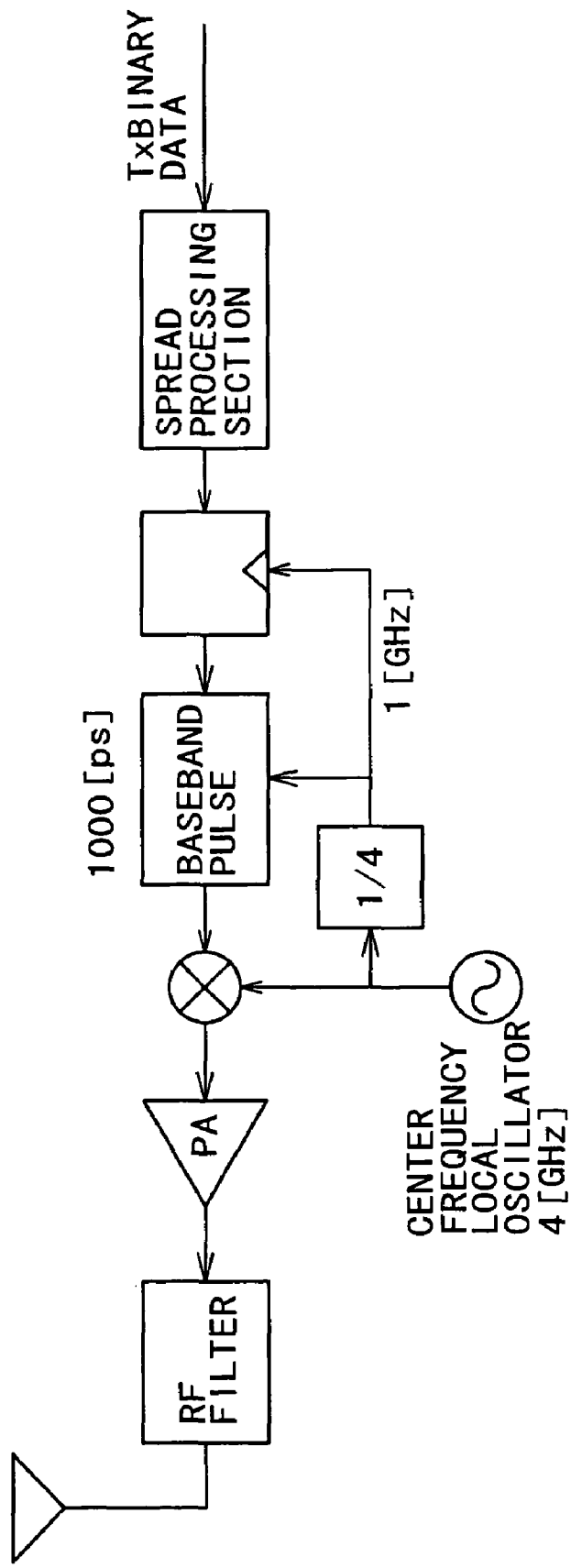
FIG. 5 schematically shows a function configuration of an RF transmission function module in a communication apparatus according to an embodiment of the present invention.
Figure 6:
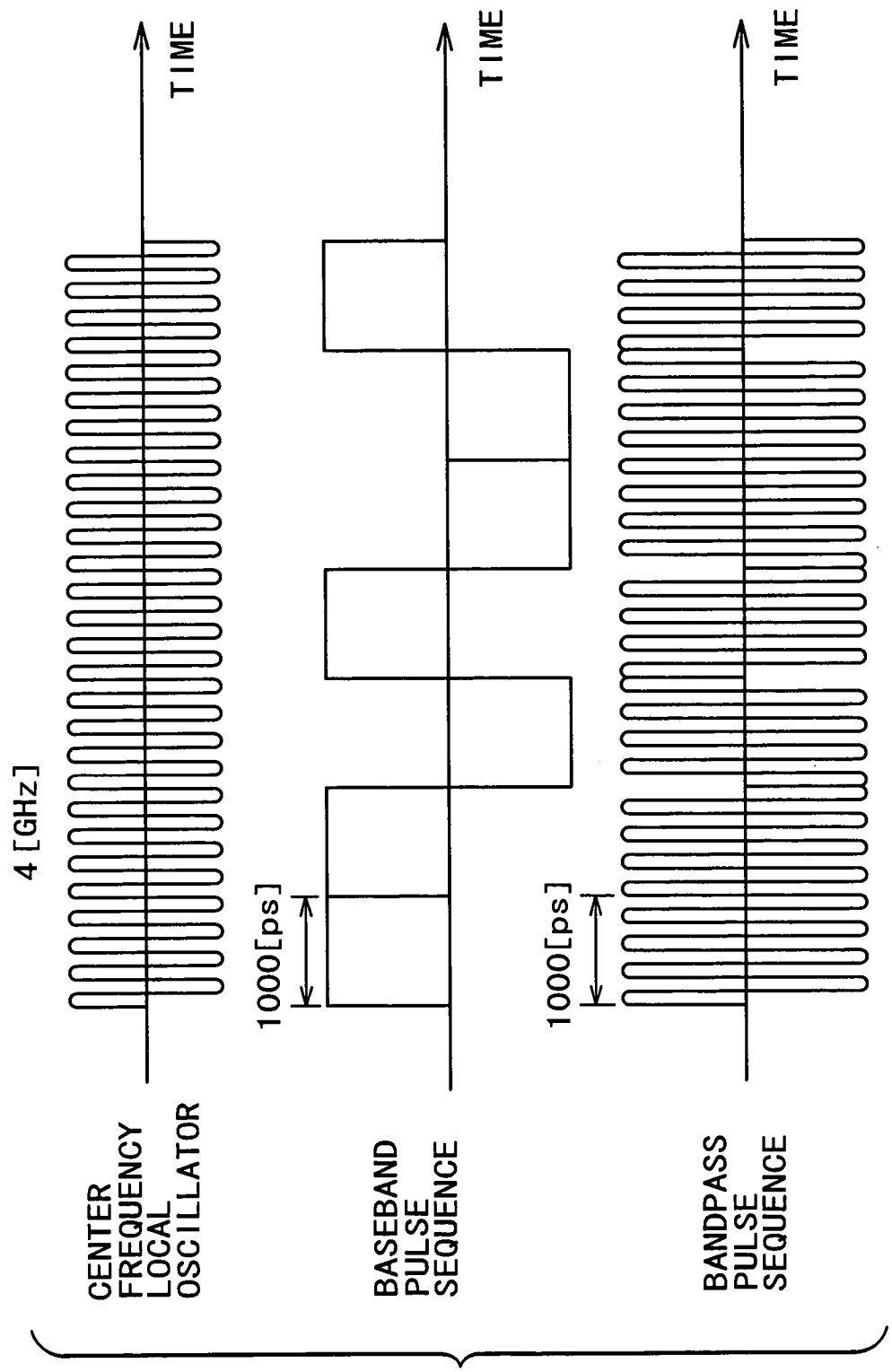
FIG. 6 is a chart showing operation characteristics of the RF transmission function module in FIG. 5.

FIG. 5 schematically shows a configuration of an ultra wide band transmitter. FIG. 6 is a chart showing operation characteristics of the RF transmission function module.

Transmission data is directly spectrum-spread in a spread processing section and is passed as binary data to an RF function module. The RF transmission function module has an oscillator with the center frequency of 4 GHz. This oscillation frequency is divided by four to generate a 1 GHz square pulse as a baseband pulse. The pulse width is 1/1 [GHz]=1000 picoseconds.

This pulse is modulated (multiplied) by a 4 GHz carrier to generate a 4-cycle pulse. This 4-cycle pulse is amplified by a power amplifier (PA), is subject to RF filtering, and then is transmitted to a transmission channel from an antenna.

Here, let us assume the pulse rate, i.e., the spread rate to be Nss against 1 GHz obtained by dividing the carrier frequency by 4, and the symbol rate to be fsym=4[GHz]/Nss. For transmission channel estimation in the receiver, the transmitter transmits a training pattern and then transmits transmission data. The training pattern comprises a short code that repeats the same pattern for each symbol. The training pattern will be described later in more detail.

Figure 7:
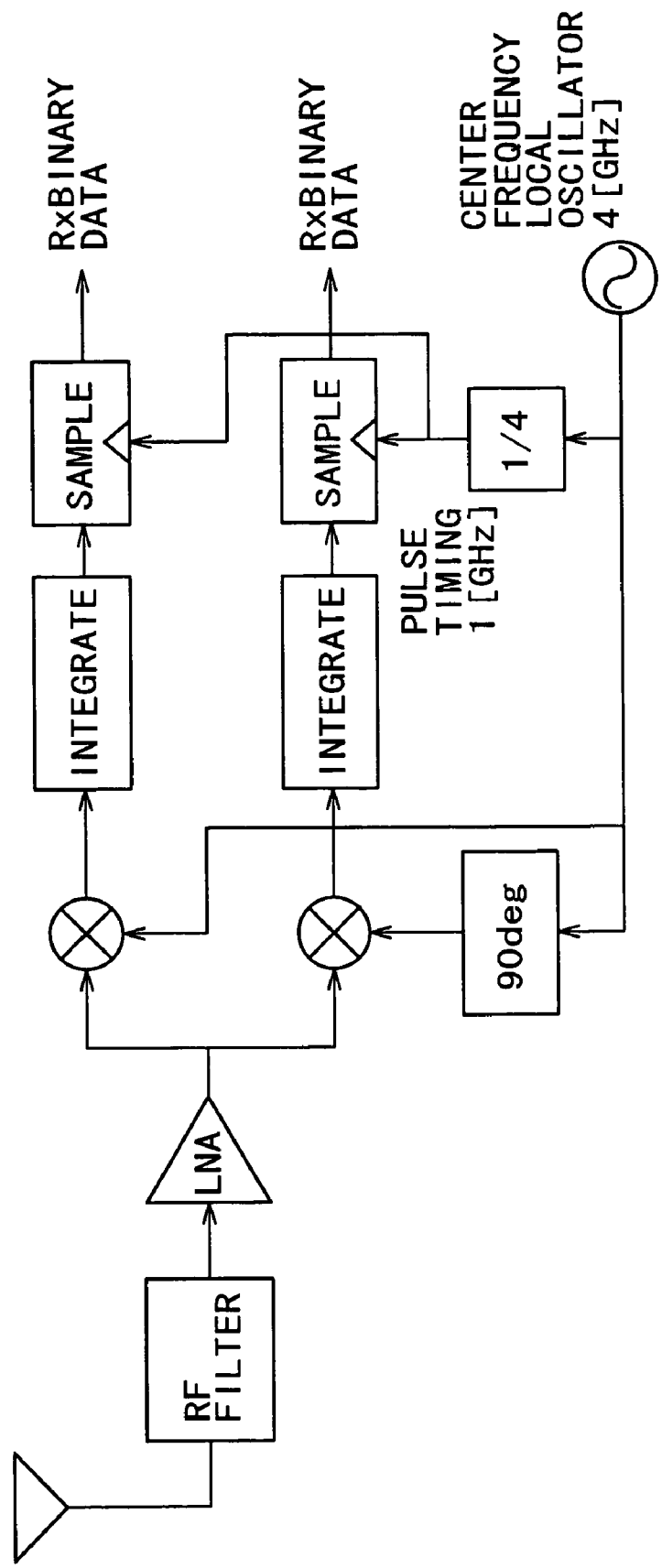
FIG. 7 schematically shows a function configuration of an RF reception function module corresponding to the RF transmission function module in FIG. 5.

FIG. 7 schematically shows a function configuration of an RF reception function module corresponding to the RF transmission function module as shown in FIG. 5.

The receiving side quadrature-detects the received signal using a carrier having the same frequency as for the transmission to detect a baseband pulse sequence and performs despreading and decoding to extract the received data (binary data).

Figure 8:
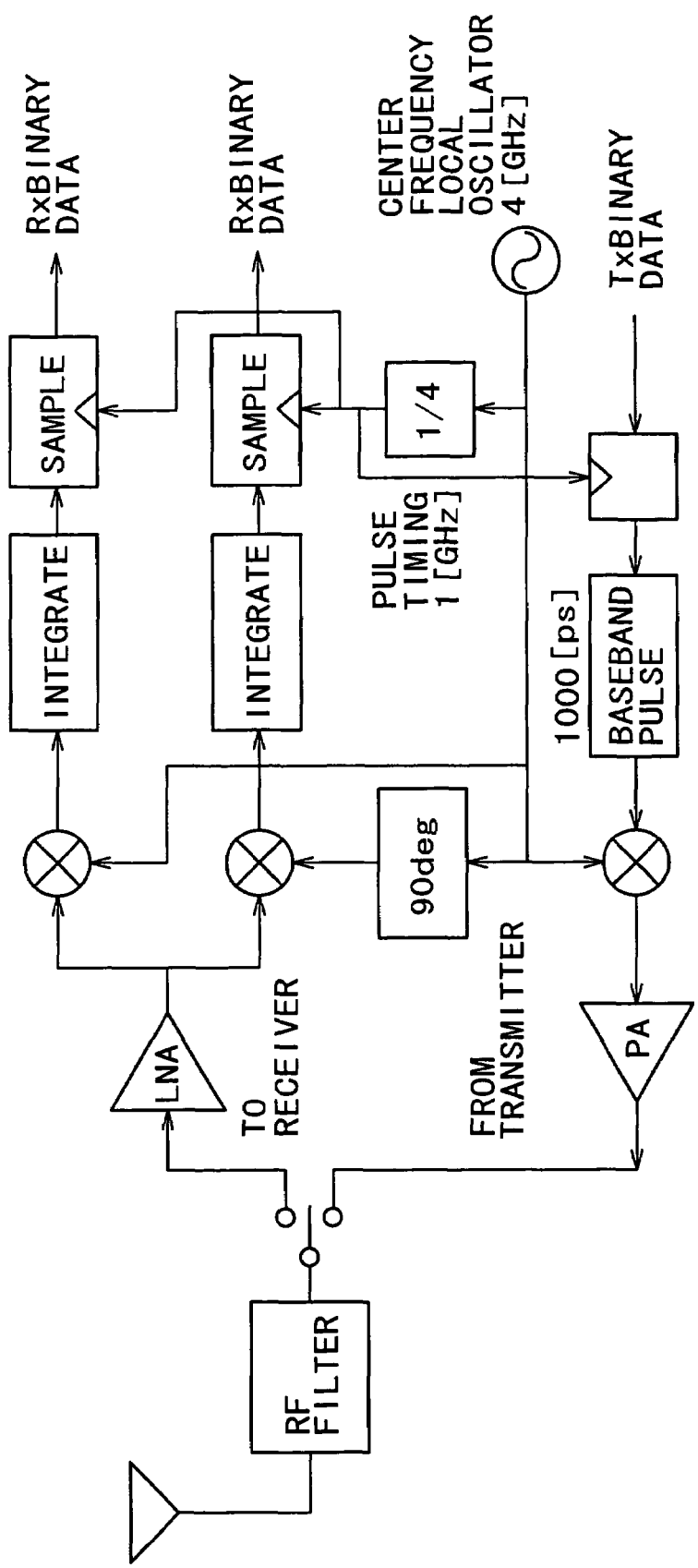
FIG. 8 schematically shows a transmitter-receiver for UWB communication in combination with the direct sequence spread spectrum.

The use of both functions in FIGS. 5 and 7 provides the transmitter-receiver for UWB communication in combination with the direct sequence spread spectrum (see FIG. 8).

Figure 9:
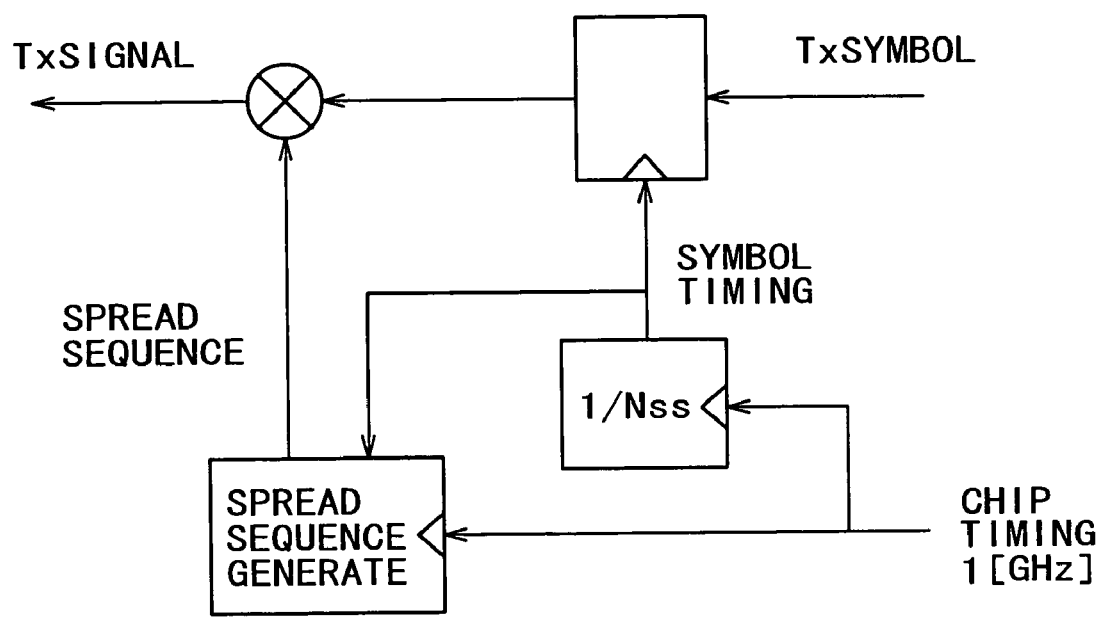
FIG. 9 shows a direct spread circuit example.

FIG. 9 exemplifies a direct spread circuit. As shown in FIG. 9, a spread information signal can be obtained by multiplying a transmission symbol (TxSymbol) by a spread chip sequence.

First, the symbol rate is obtained by precisely setting the spread chip rate to 1/Nss. The spread chip rate is obtained by dividing the carrier frequency by 4. The embodiment assumes Nss to be 10.

Then, a spread sequence is generated based on the chip timing and the symbol timing.

A spread information signal (TxSignal) is generated by multiplying the spread sequence and the transmission symbol together. When a digital circuit is used for the configuration, this multiplication is completely equivalent to exclusive OR (EX-OR).

The spread sequence comprises a so-called short code that repeats the same pattern for each symbol length.

Figure 10:
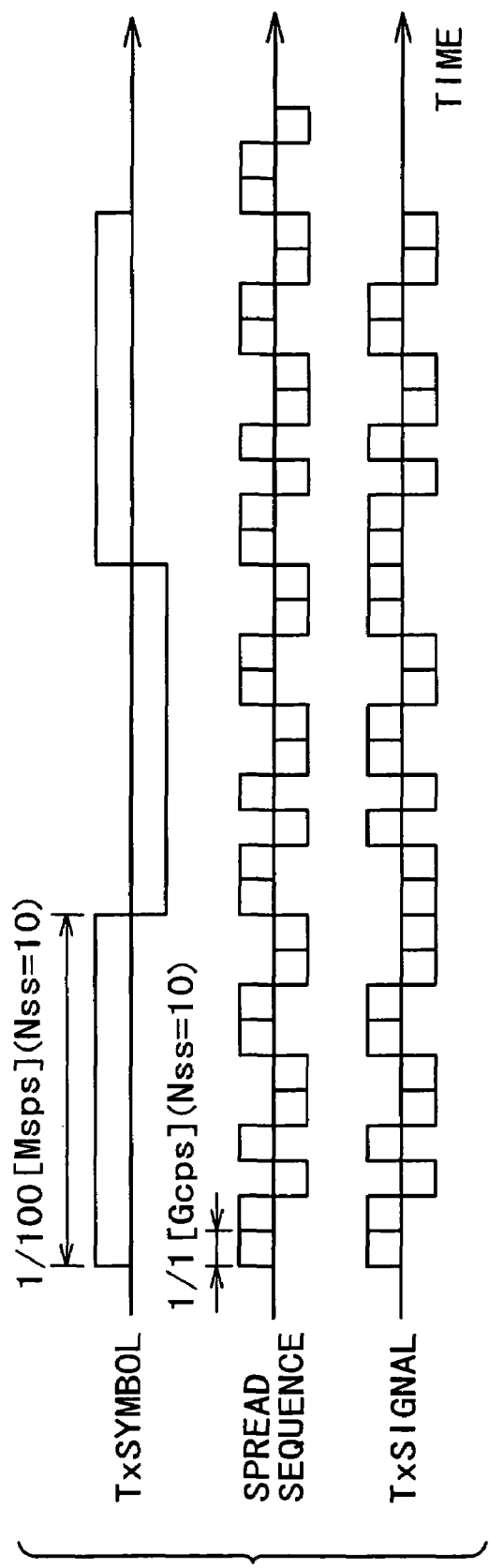
FIG. 10 is a chart showing how a transmission symbol is spread by a spread sequence comprising a short code.

FIG. 10 shows how to spread a transmission symbol using a spread sequence comprising the short code. As shown in FIG. 10, the spread sequence is a pattern of chips concatenated for the transmission symbol length. The chip width is determined by dividing the symbol length by the spread rate Nss (=10). The same pattern is repeated for each transmission symbol. The transmission signal is obtained by multiplying the transmission symbol and the spread sequence together.

Depending on cases, the spread may use a so-called long code, i.e., a sequence longer than the symbol length. These codes are distinguished from each other and are used according to purposes. Originally, the long code is favorable for the direct sequence spread spectrum. The short code is effective for synchronization detection.

Figure 11:
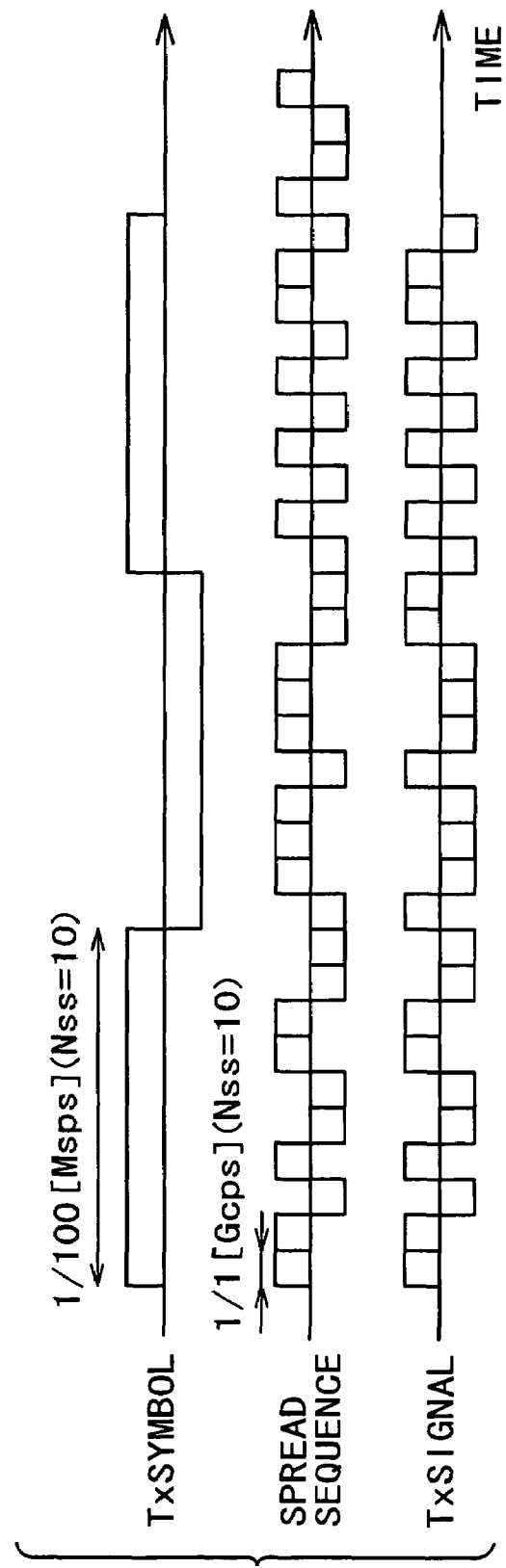
FIG. 11 is a chart showing how a transmission symbol is spread by a spread sequence comprising a long code.

FIG. 11 shows how to spread a transmission symbol using a spread sequence comprising the long code. As shown in FIG. 11, the spread sequence is a pattern of chips concatenated longer the transmission symbol length. The chip width is determined by dividing the symbol length by the spread rate Nss (=10). The transmission signal is generated by repeatedly multiplying the transmission symbol and the spread sequence together.

Figure 12:
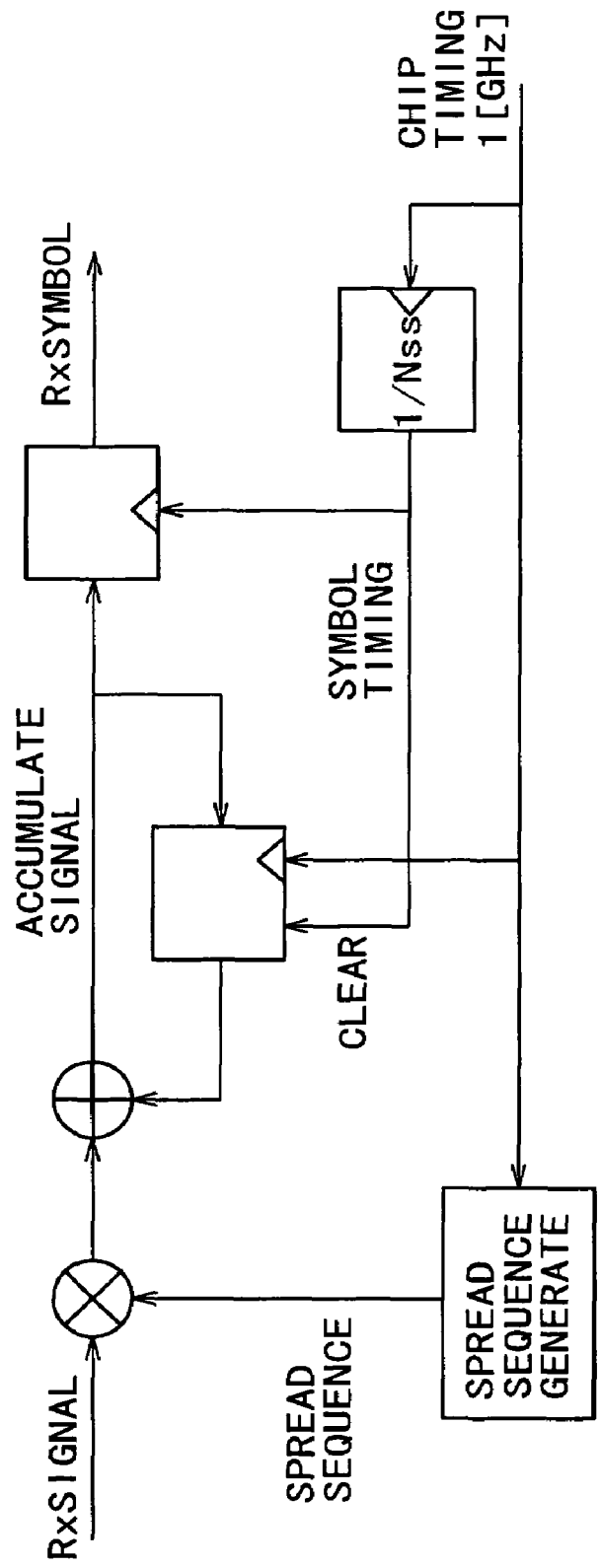
FIG. 12 schematically shows function blocks for performing basic despread operations.
Figure 13:
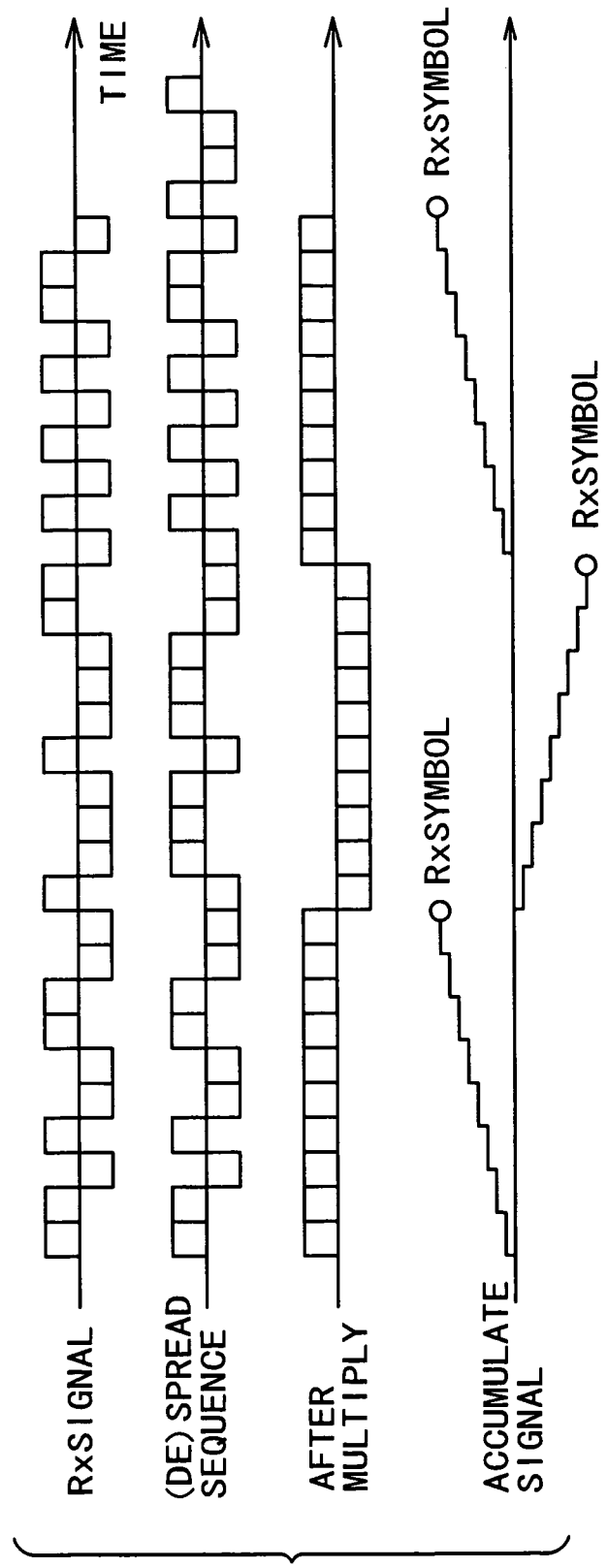
FIG. 13 is a chart showing operations for despreading a received signal.

FIG. 12 schematically shows function blocks for performing basic despreads operations. FIG. 13 shows operations for despreading a received signal.

In the same manner as the transmission side, the same spread sequence is generated. The received signal (R×Signal) is multiplied by the same pattern ((De) Spread Sequence) as the spread sequence used for the transmission to yield a result (After Multiply). The result is integrated during a symbol period. At the end of the symbol period, the integrated value (Accumulate Signal) is retained as an accumulated value that becomes a reception symbol. Further, the integrated portions are sequentially cleared to be used for the subsequent integration.

However, an actual receiver is subject to the following problems: (1) uncertainty of the carrier phase due to carrier phase rotation; (2) uncertainty of the chip timing; and (3) uncertainty of the spread sequence phase and the symbol timing.

Figure 14:
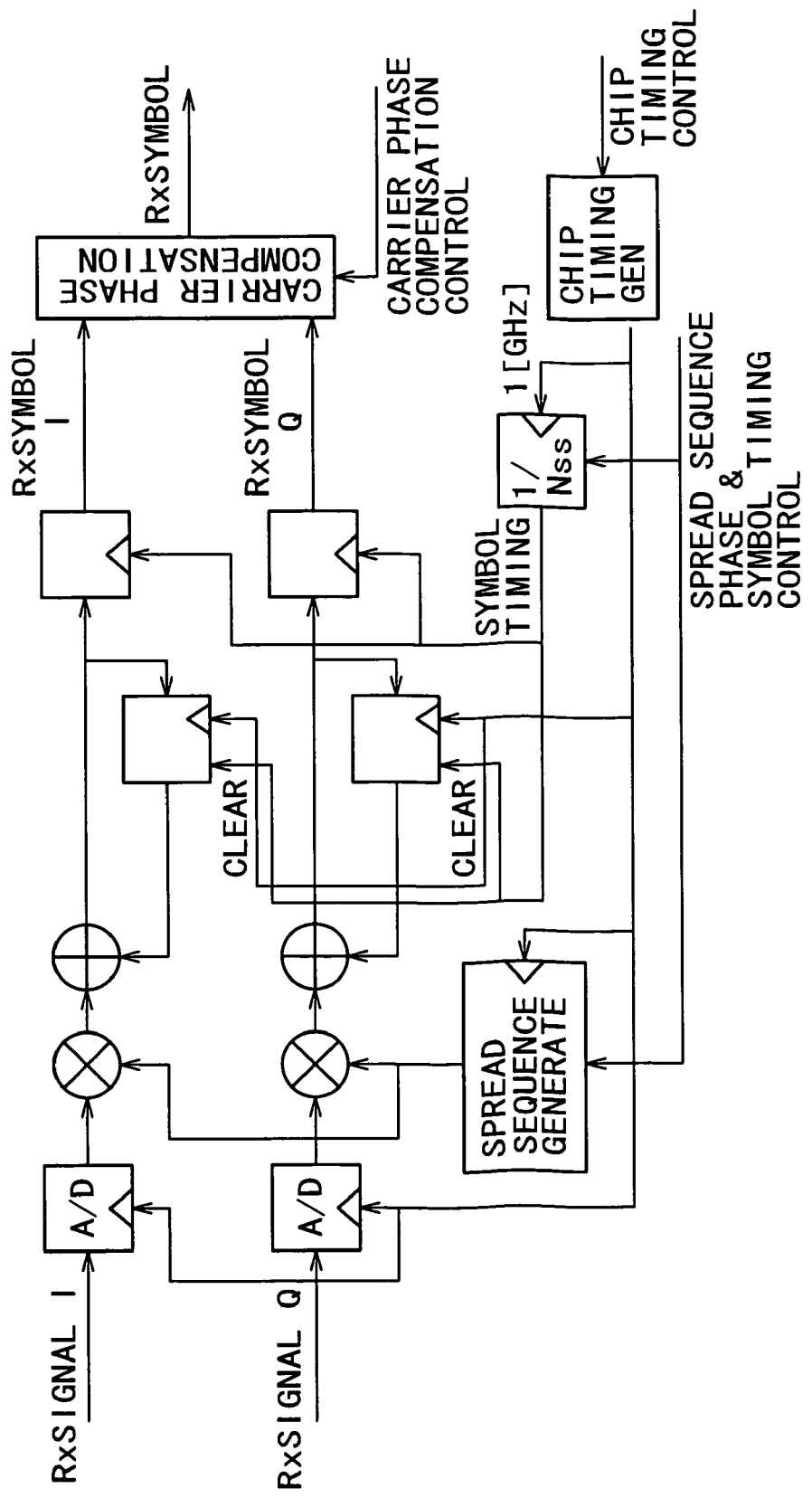
FIG. 14 shows an actual circuit configuration example of a despread block.

For this reason, modulation is unavailable using only the basic operations as described with reference to FIGS. 12 and 13. To solve this problem, a circuit as shown in FIG. 14 actually configures the receiving side's despread block.

The received signal is first quadrature-detected using a carrier having the same frequency as the transmission. The detected received signal contains values I (R×Signal I) and Q (R×Signal Q). These values are A/D converted and are passed to the subsequent digital processing. The received signals are multiplied by the same pattern as the spread sequence used for the transmission on a complex-number basis. The multiplication results are integrated on a complex-number basis during the symbol periods to obtain the reception symbols (R×Symbol I and R×Symbol Q) on a complex-number basis. The carrier phase correction is then applied to the reception symbols to yield a reception symbol (R×Symbol).

Figure 15:
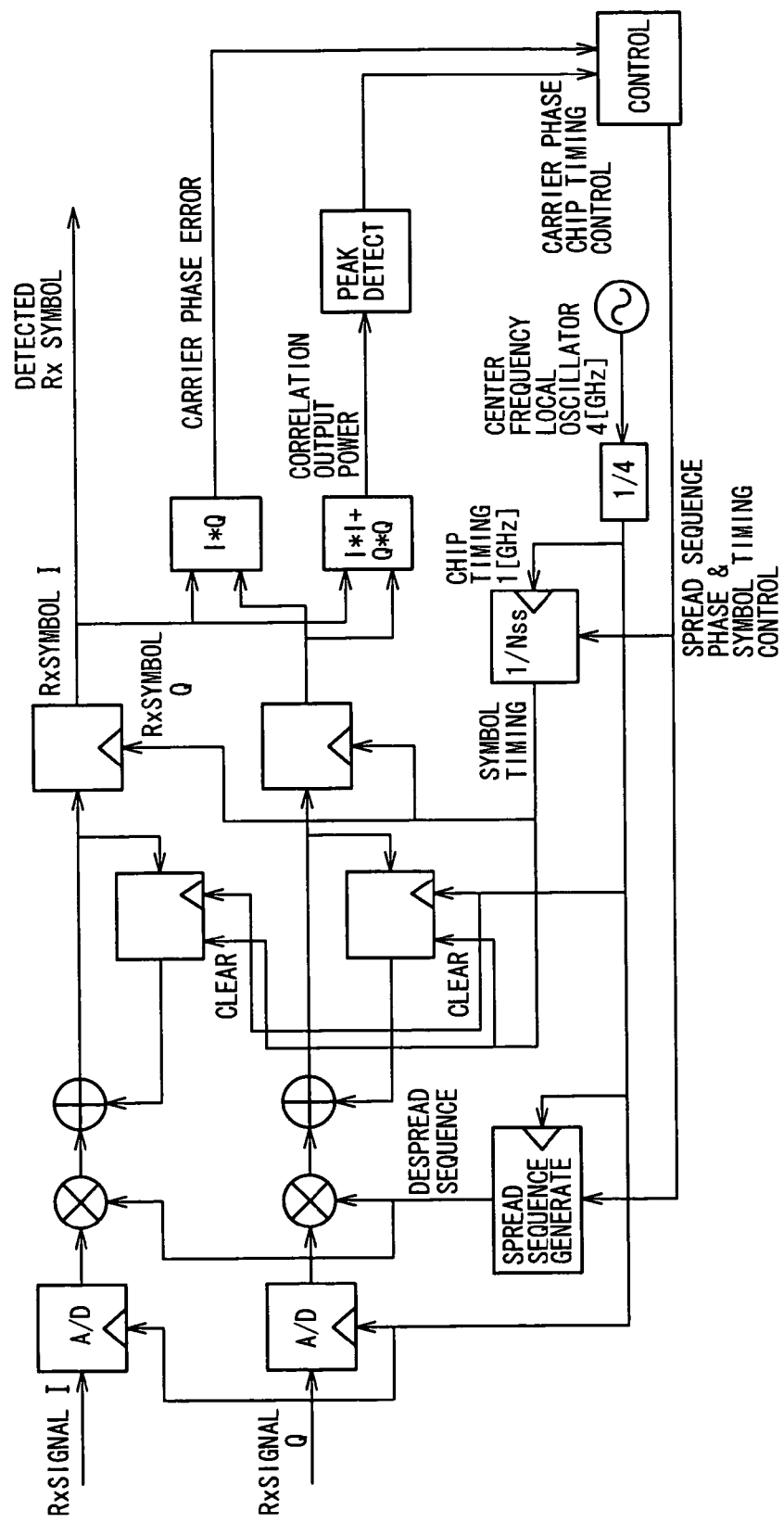
FIG. 15 shows a digital signal processing section of a receiver including a functional configuration for sliding correction and tracking.
Figure 16:
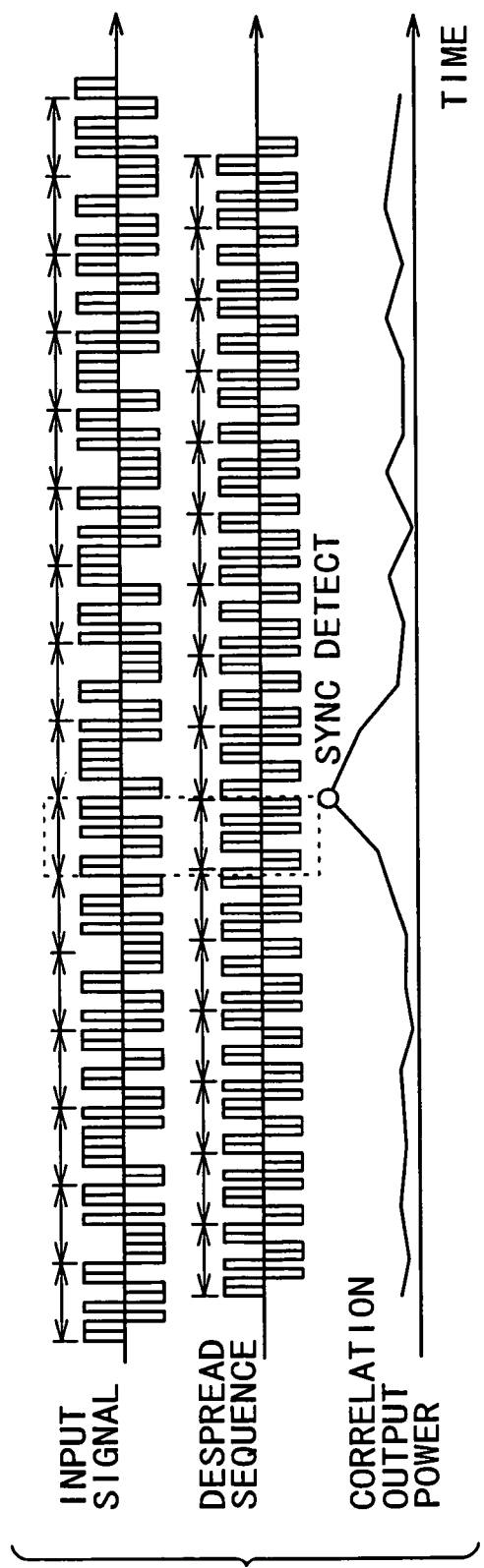
FIG. 16 is a chart showing how the sliding correction is performed.

There may be a case where it is impossible to identify the chip timing and the phase of the spread sequence generated synchronously with the chip timing. In such case, the chip timing and the phase must be found first. For this purpose, the short code is generally used because the use of the long code makes it difficult to find them. FIG. 15 shows a digital signal processing section of a receiver including the functional configuration for sliding correction and tracking when the carrier synchronizes with the chip rate. FIG. 16 shows the relationship among an input signal, a spread sequence, and correlation output when the sliding correction is performed. The following describes sliding correlation and a tracking loop. It is assumed that the values I (R×Signal I) and Q (R×Signal Q) in the received signal are A/D converted and are passed to the digital processing.

(1) A spread sequence generation section periodically generates a short code spread sequence. A reference oscillator VCO is controlled so as to provide a frequency slightly deviated from (earlier than) the received signal cycle. In this manner, the chip timing is intentionally deviated with a sufficiently small amount.

(2) Such operation for sliding correlation is continued. At a certain timing later on, the chip timing will match the short code spread sequence. When a match occurs, the signal after despread will have a large correlation output power, i.e., I×I+Q×Q (see Sync Detect in FIG. 16). Here, the signal after despread signifies a result of multiplying the short code spread sequence and the received signal together. Therefore, detecting this power (Peak Detect) makes it possible to know the match, i.e., the pulse position detection.

(3) When the match is found, the reference oscillator's slightly deviated frequency is returned to the correct frequency.

(4) The process so far can provide the chip timing, but not the carrier phase. To solve this problem, the output signals I and Q are multiplied together (I×Q). This removes the ±1 symbol information included in the received signal to acquire carrier phase error information (Carrier Pulse Error)

(5) The carrier phase error information is fed back to the reference oscillator. Then, a control loop is configured to zero a carrier phase error. In this manner, the carrier phases are synchronized.

(6) The same reference oscillator supplies the carrier and the chip timing that are therefore synchronized with each other. The baseband pulse is obtained at a time interval equivalent to the integral division of the carrier frequency. The carrier phases are synchronized and tracked. At the same time, the chip timing is tracked.

However, the above-mentioned configuration for sliding correlation leaves the following problems unsolved.

Since the sliding correlation requires slow sliding, the synchronization needs a relatively long time.

During timing detection, an attempt may be made to improve a low S/N ratio by means of the average. In such case, a correlation output power value is used as information for pulse position detection. The average less effectively contributes to the S/N improvement.

The frequency is deviated for the sliding correlation and is returned to the correct frequency during synchronization detection. In such case, a PLL synthesizer is used to change frequencies. The frequency settlement takes a long time, thus requiring a relatively long time for the synchronization.

The following describes how to fast find a pulse position, amplitude, and phase when the carrier synchronizes with the chip rate.

B. Coherent Channel Measurement of a Transmission channel

If it is possible to measure transmission channel characteristics including a transmission delay amount, the method can be applied to timing synchronization, carrier phase synchronization, RAKE reception configuration, and link adaptation. The following describes this method in detail.

Figure 17:
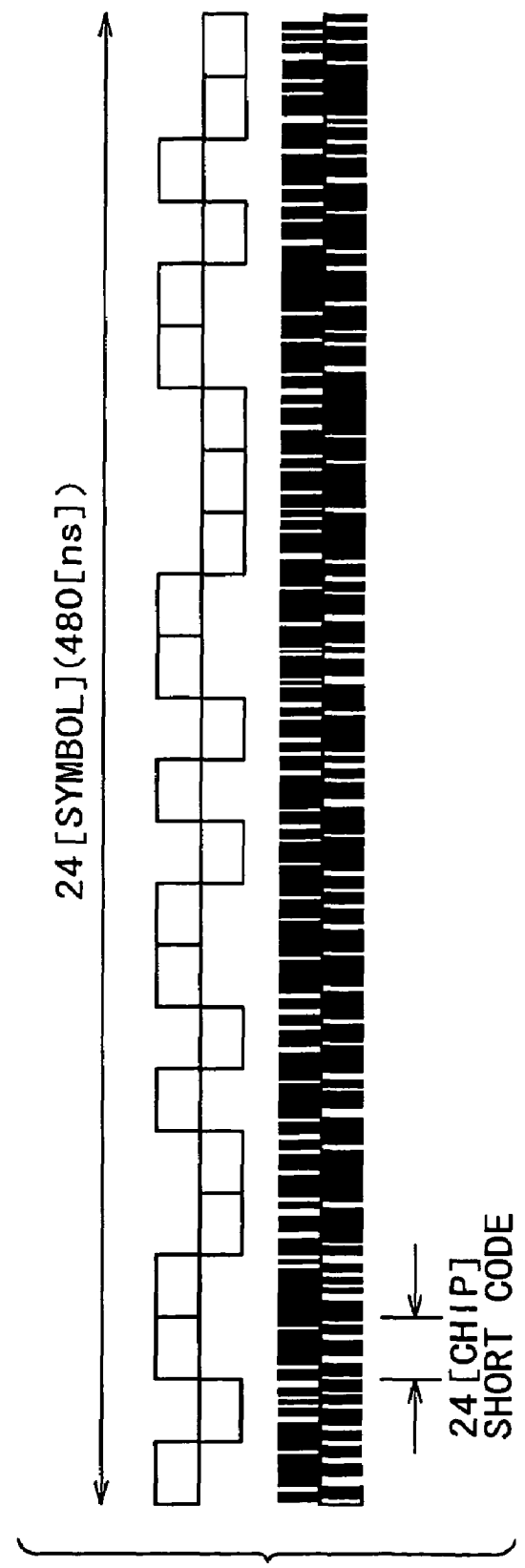
FIG. 17 exemplifies one cycle of a training symbol.

According to the embodiment, the communication apparatus itself is preceded by a training section that performs coherent channel measurement of transmission channels. The measurement is conditioned on the following parameters. The parameters are suitable for satisfying the above-mentioned FCC rule requirements and do not limit the present invention. FIG. 17 illustrates one cycle of training symbol.

One giga-chips per second and a 1000-picosecond chip cycle 50 mega-symbols per second and a 20-nanosecond symbol cycle (spread rate Nss=20)

Measuring a period of 20-nanosecond symbol cycle (i.e., equivalent to the short code length) and using the resolution capable of measuring 80 points at a 250-picosecond cycle (equivalent to N cycles of the carrier)

A 20-chip short code

A training pattern comprising a 24-symbol pattern repeated at a 480-nanosecond cycle Provided with a sufficiently accurate frequency reference for transmission and reception (480-nanosecond cycle)

Figure 18:
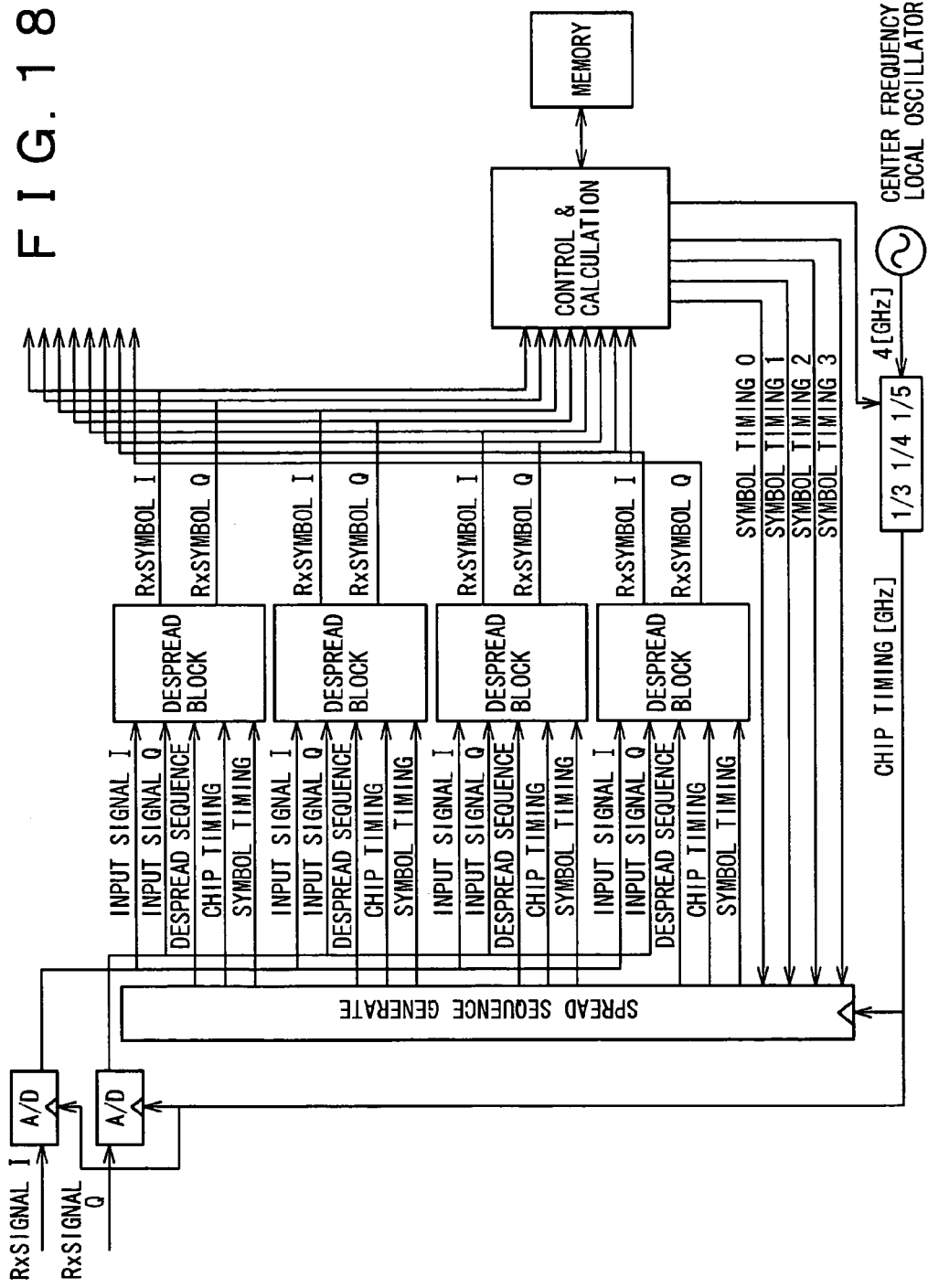
FIG. 18 shows a device configuration of a coherent channel measuring section.

FIG. 18 shows a hardware configuration of a coherent channel measuring section. The coherent channel measuring section is configured for digital processing. The quadrature detection is used to detect received signal values I (R×Signal I) and Q (R×Signal Q). These values are A/D converted by the chip timing (1 GHz) and are input to the coherent channel measuring section.

As shown in FIG. 18, the coherent channel measuring section comprises a divider circuit and a spread code generation section (Spread Code Generation). The divider circuit divides the 4 GHz center frequency to generate a chip timing. The spread code generation section generates a spread code based on the chip timing. The spread code generation section comprises a control section (Control & Calculation) and despread blocks (Despread Block). The despread block despreads a digitally processed received signal. A feature of the coherent channel measuring section is provision of four despread blocks for fast measurement. Of course, a single despread block suffices if there is no need for fast measurement.

The spread code generation section generates a short code comprising 20 chips at four types of timings according to a command from the control section (see the description later and FIG. 20). The short codes are deviated at the same timing. In addition, the spread code generation section passes a short code spread sequence together with the symbol timing to each despread block. Each despread block uses this signal for despread.

Basically, the 4 GHz center frequency is divided by 4 to generate a 1 GHz chip rate. However, the control section is configured to issue a 5-division command so as to adjust the 250-picosecond timing, i.e., the time resolution for measurement.

For the coherent channel measurement of the transmission channel, the control section observes: (1) four measurement points in the chip interval; (2) 20 chips in the symbol period; and (3) which point to measure in 24 symbols equivalent to the training pattern length. The control section issues commands for these conditions to the spread code generation section and the divider circuit.

Figure 19:
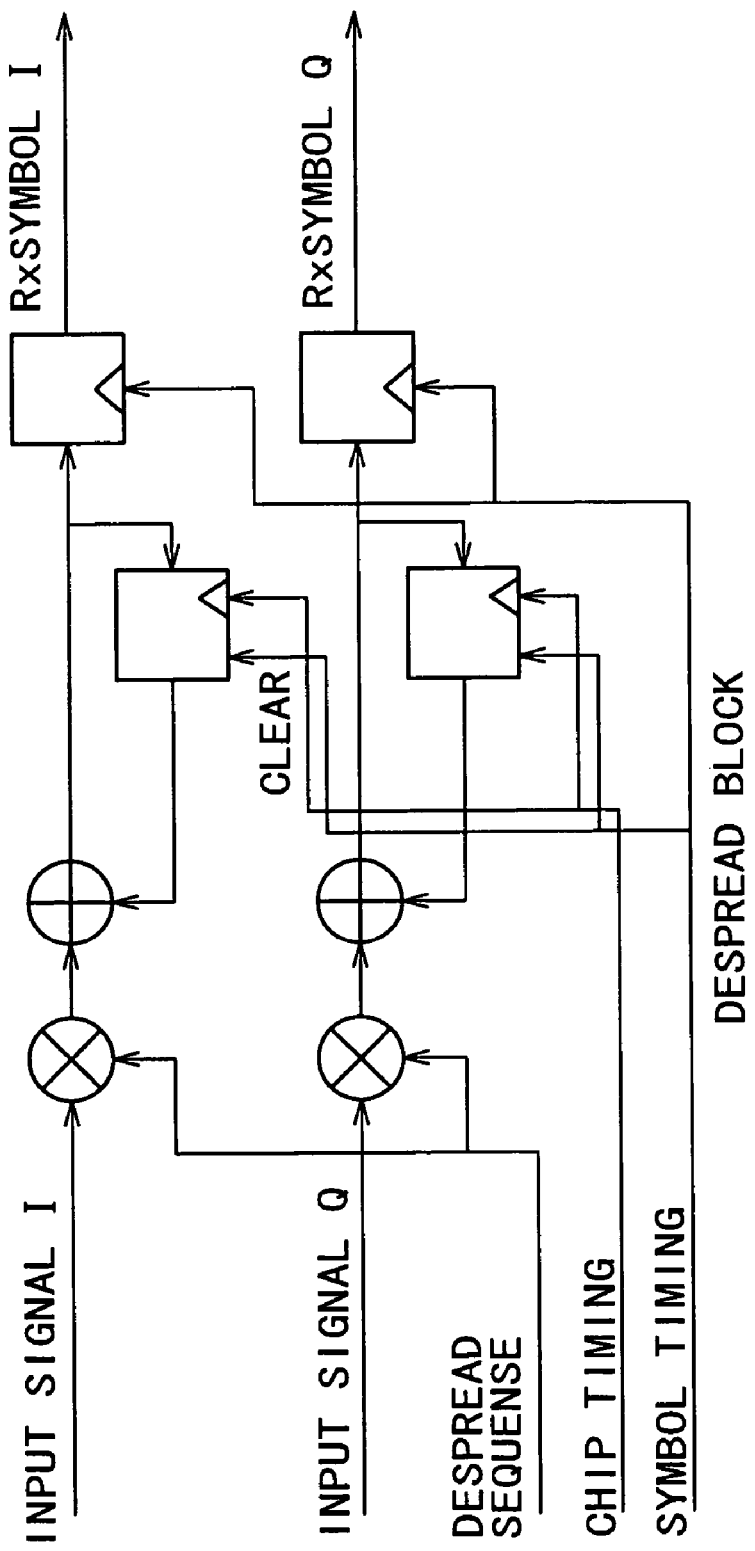
FIG. 19 shows the configuration of the despread block in the coherent channel measuring circuit shown in FIG. 18.

FIG. 19 shows a configuration of the despread block in the coherent channel measuring circuit shown in FIG. 18.

The quadrature detection is used to detect received signal values I (R×Signal I) and Q (R×Signal Q). These values are A/D converted by the chip timing (1 GHz) and are input to the despread block. The spread code generation section supplies a despread sequence, i.e., the same pattern as the spread sequence used for the transmission. The despread sequence is multiplied by these received signals on a complex-number basis. The multiplication results are integrated on a complex-number basis during the symbol periods to obtain the reception symbols (R×Symbol I and R×Symbol Q) on a complex-number basis. A correlation output can be obtained by summing the squared reception symbols (I×I+Q×Q) after the despread.

Figure 20:
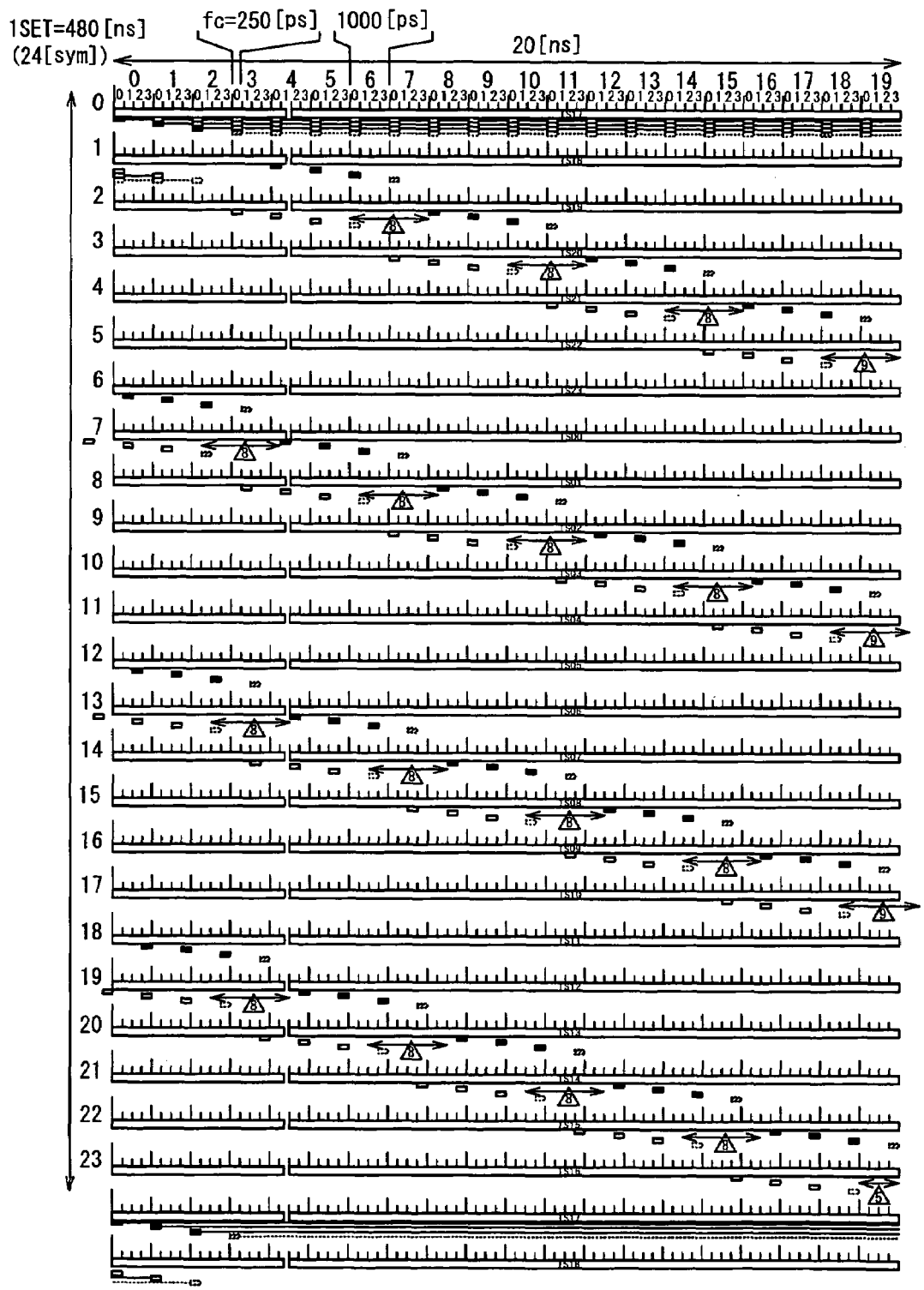
FIG. 20 shows a sequence of basic operations in the coherent channel measuring section.

FIG. 20 shows a sequence of basic operations in the coherent channel measuring section. With reference to FIG. 20, the following describes in detail a procedure to measure the transmission channel.

Symbols 0 through 23 represent one cycle (480 nanoseconds) of the training symbol. One symbol comprises chips 0 through 19 (20 nanoseconds). Further, one chip (1000 picoseconds) is provided with phases (numbers 0 through 4) in chip. When the carrier frequency is 4 GHz, one cycle of the carrier is equivalent to 250 picoseconds. This is used as the time resolution for the measurement.

(1) At the first step of the measurement, the control section allows the four despread blocks to acquire correlation values using the short codes beginning with 0-0-0, 0-1-0, 0-2-0, and 0-3-0, i.e., a combination of "symbol"-"chip"-"phase in chip", respectively. The four despread blocks completely acquire all of the correlations until the combination reaches 1-2-0. The measured data is stored in the memory.

(2) The next measurement starts after a wait of eight 4 GHz cycles, i.e., equivalent to two chips. The control section allows the four despread blocks to acquire correlation values using the short codes beginning with 1-4-0, 1-5-0, 1-6-0, and 1-7-0, i.e., a combination of "symbol"-"chip"-"phase in chip", respectively.

The same operation is performed for the points beginning with the following combinations of "symbol"-"chip"-"phase in chip".

2-8-0, 2-9-0, 2-10-0, 2-11-0

3-12-0, 3-13-0, 3-14-0, 3-15-0

4-16-0, 4-17-0, 4-18-0, 4-19-0

The combinations end up with 5-18-0.

(4) The control section waits for nine 4 GHz cycles, i.e., equivalent to two and a quarter chips. The control section allows the four despread blocks to acquire correlation values using the short codes beginning with 6-0-1, 6-1-1, 6-2-1, and 6-3-1, i.e., a combination of "symbol"-"chip"-"phase in chip", respectively.

(5) Like procedure (3), the same operation is subsequently performed for the points beginning with the following combinations of "symbol"-"chip"-"phase in chip".

7-4-1, 7-5-1, 7-6-1, 7-7-1

8-8-1, 8-9-1, 8-10-1, 8-11-1

9-12-1, 9-13-1, 9-14-1, 9-15-1

10-16-1, 10-17-1, 10-18-1, 10-19-1

(6) To measure points for procedure (2) in the chip, the control section then performs the same operations as for procedures (4) and (5).

(7) To measure points for procedure (3) in the chip, the control section then performs the same operations as for procedures (4) and (5). In this manner, the control section can completely measure all the 80 points until the "symbol"-"chip"-"phase in chip" combination reaches 23-18-3. By this time point, it has passed the time equivalent to 24 symbols, i.e., the training cycle.

(8) The measured values are averaged to measure the channel state with an increase S/N ratio. FIG. 21 shows a circuit configuration for averaging measurement results. According to the example in FIG. 20, the measurement starts from the same measurement point after a wait of five 4 GHz cycles (equivalent to one and a quarter chips). The same training symbol should be transmitted. The operations from (1) to (7) above are repeated once more. The result is added to the previous measured value to improve the S/N ratio.

(9) The operation of procedure (8) is repeated (e.g., ten times) until a sufficient S/N ratio is obtained.

In addition, let us assume that the actually received training starts with the timing corresponding to, for example, 8-4-2, i.e., the combination of "symbol"-"chip"-"phase in chip".

Figure 22:
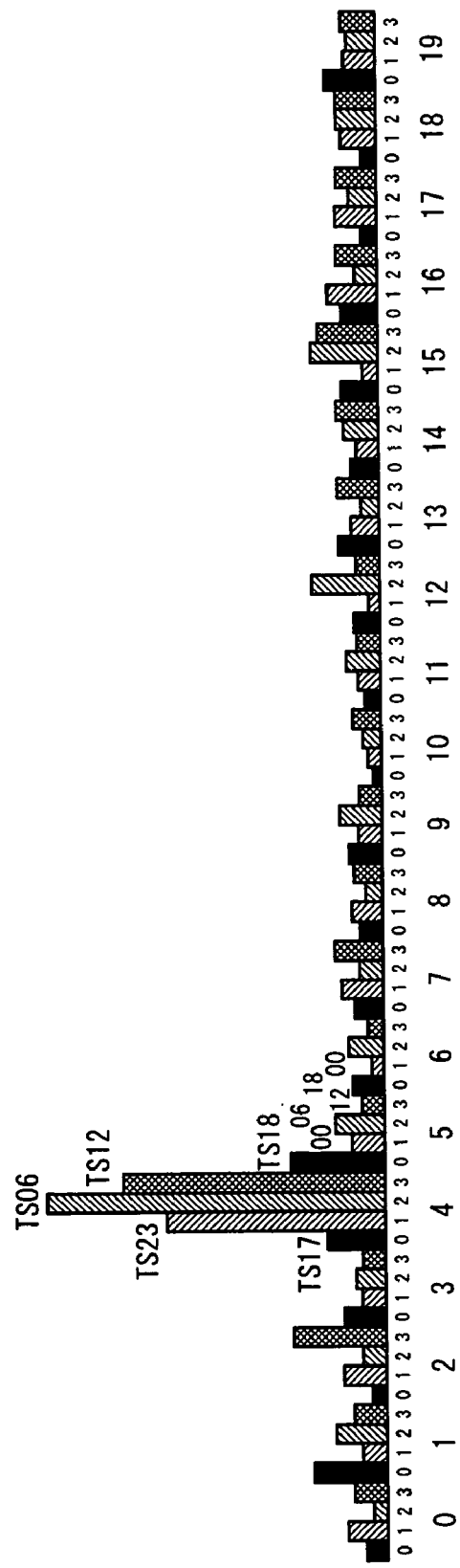
FIG. 22 shows a result of adding measured values at 80 measured points.

(10) FIG. 22 shows a result of adding the measured values at the 80 measured points, i.e., a result of the measured channel response (power). When comparing powers for the measured values at the 80 measured points, the largest power should be detected at the combination of 13-4-2 for "symbol"-"chip"-"phase in chip". Accordingly, it is possible to detect that the reception symbol starts at the timing of x-4-2. In other words, this is completion of the detection of chip timing and spread sequence phases.

(11) Procedure (10) does not indicate which of the 24 symbols is received at the combination of 13-4-2 for "symbol"-"chip"-"phase in chip". The, the short code beginning with the next x-4-2 timing is used to receive and detect (demodulate) some symbols (e.g., ten symbols). By comparing the detected symbols and training patterns, it is possible to determine which of the 24 training symbols is received. The example in FIG. 22 shows that TS06 corresponds to the symbol at the combination of 13-4-2 for "symbol"-"chip"-"phase in chip".

(12) It is possible to determine which of the 24 training symbols is measured at the other measurement points. Each measured value for 80 points is multiplied by ±1 of the training to remove the effect of the training patterns from the measured values for the 80 points. In this manner, it is possible to finally obtain the transmission characteristics for the 80 points at the 250-picosecond resolution in the 20-nanosecond period.

Figure 23:
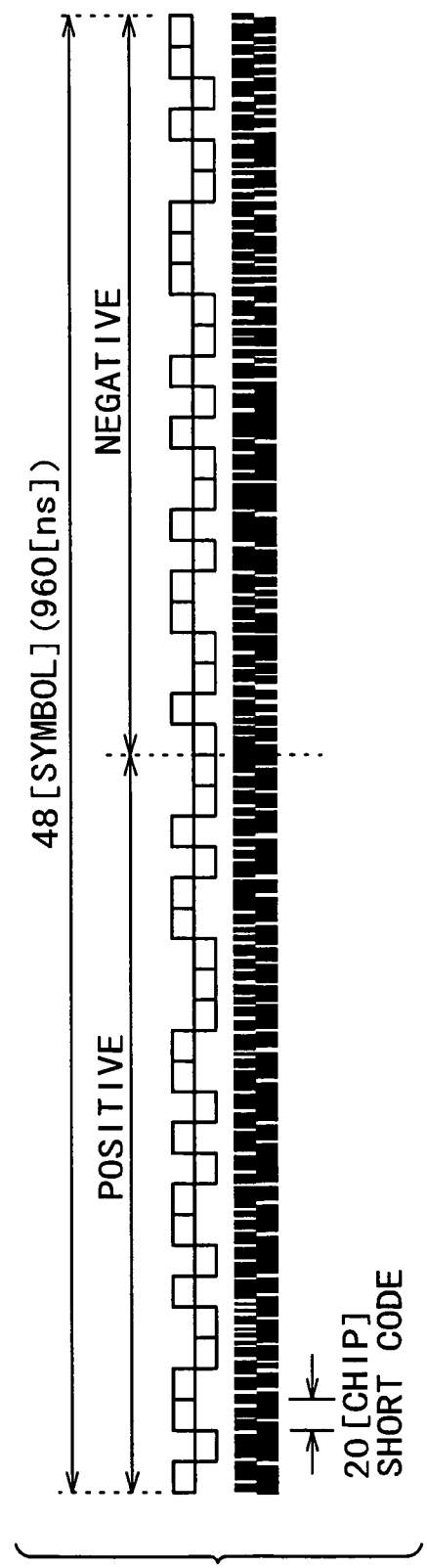
FIG. 23 illustrates a 48-symbol training pattern comprising a 24-symbol pattern suffixed by the reversed 24-symbol training pattern.

The above-mentioned description uses the training pattern, i.e., the symbol pattern (480-nanosecond cycle) comprising 24 repetitions of the 20-chip short code at the chip cycle of 1000 picoseconds (see FIG. 17). Further, the 24-symbol training can be suffixed by its reverse to provide the training length comprising a cycle of 48 symbols in total. FIG. 23 shows a 48-symbol training pattern comprising the 24-symbol training suffixed by its reverse.

Doubling the preamble length in this manner requires the same operations in procedures (1) through (7) for the transmission channel measurement. When the measured values are averaged in procedures (8) and (9) for measuring the channel state at a higher S/N ratio, addition and subtraction are performed alternately. FIG. 24 shows a circuit configuration for averaging measurement results.

The FCC rule specifies that the radiated spectrum power be measured at 1 MHz. Since the embodiment uses the 24-symbol training pattern suffixed by its reverse, a cycle of 48 symbols in total results in 960 nanoseconds (approximately 1 microsecond) Almost flat spectrums can be measured at every 1 MHz, making it possible to realize radiation of a maximum power within the range satisfying the FCC rule. On the other hand, it is obvious that shortening the cycle makes the measurement (or synchronization detection) easier. Based on this principle, however, the total power needs to be dropped for satisfying the FCC rule.

While the embodiment adds the reverse of the symbol pattern to provide the 960-nanosecond training length, the other techniques may be used to set the training length to approximately 960 nanoseconds.

The following describes the coherent channel measurement method when even the training location is unknown.

Let us assume that ten sets are needed to average the measured values. According to the above-mentioned description about the basic operations of the coherent channel measurement, the accumulated value is subject to ten additions from the zero state.

Figure 25:
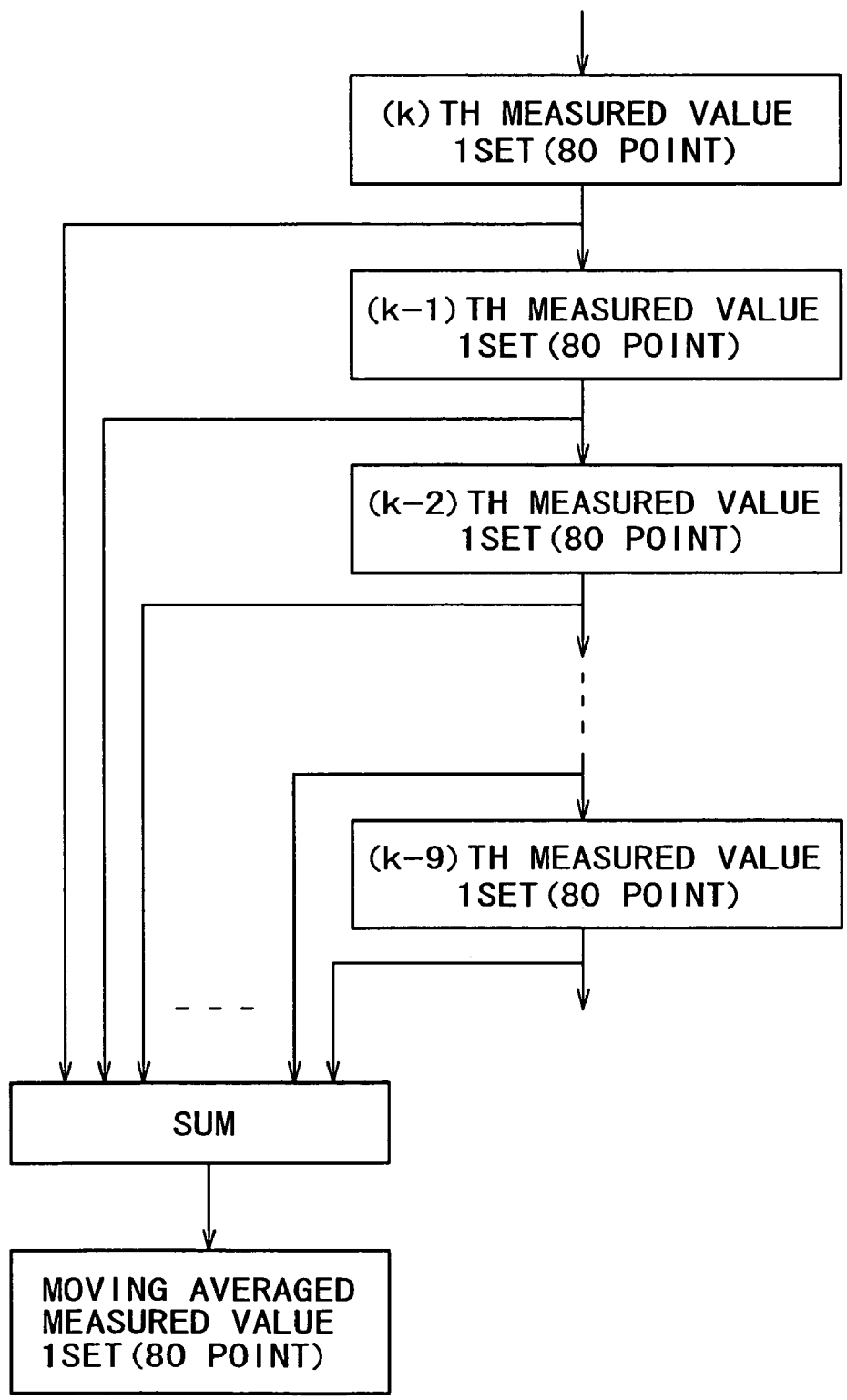
FIG. 25 shows a circuit configuration for averaging measured values by means of moving average.

If even the training location is unknown, the memory or the like is used to always store all the ten sets of measured values for the past 80 points. It is possible to acquire the most recent measured values as needed by means of moving average for the ten sets. FIG. 25 shows a circuit configuration for averaging measured values by means of moving average.

That operation makes it possible to detect any signal whose location is unknown. The operation can be used as the coherent channel measurement in multiple access systems such as CSMA (Carrier Sense Multiple Access) for bursty communication at random times.

C. Method of Tracking Chip Timings

Since the UWB provides a high bit rate, it is preferable to shorten a transmission burst to 200[ns], for example. In this case, transmission characteristics are subject to little variations. Accordingly, measured values acquired by the coherent channel measurement are effective in the burst.

While the sufficiently accurate frequency reference is ensured for transmission and reception, there is merely provided a 2 [ppm] TCXO. It is necessary to estimate a frequency error of up to 4[ppm] between transmission and reception. If there is a 4 [ppm] error, the 200 [us] burst causes approximately 200 [us]×4 [ppm]=800 [ps]. At least timing and carrier phases need to be tracked. In this example of correcting a deviation caused by a frequency error, the deviation is considered to be unidirectional and the deviation speed is considered to be constant.

Immediately after the coherent channel measurement, there is also available a chip timing detected at the 250-picosecond resolution. A phase for the complex number of the measured value corresponds to the carrier phase.

The carrier synchronizes with the chip timing. Therefore, tracking the carrier phase simultaneously tracks the chip timing. The following describes the method of tracking the carrier phase.

Simply correcting the carrier phase just needs to digitally correct the phase of the despread I/Q signal.

Since the pulse position is deviated in this example, some analog correction is needed. The embodiment assumes that the 4 GHz division is controlled to forward and backward adjust the timing in units of 250 picoseconds. This is implemented by dividing the 4 GHz carrier by 3 or 5 whereas it is normally divided by 4 as shown in FIG. 18. FIG. 26 shows a function configuration for forward and backward shifting the chip timing in units of 250 picoseconds.

This is equivalent to a ±180 [deg] error in terms of the carrier phase. The error needs to be digitally corrected. FIG. 27 shows how to resume the phase ±360 degrees by once changing the 4 GHz ¼ divider to the ⅓ or ⅕ divider.

Figure 28A:
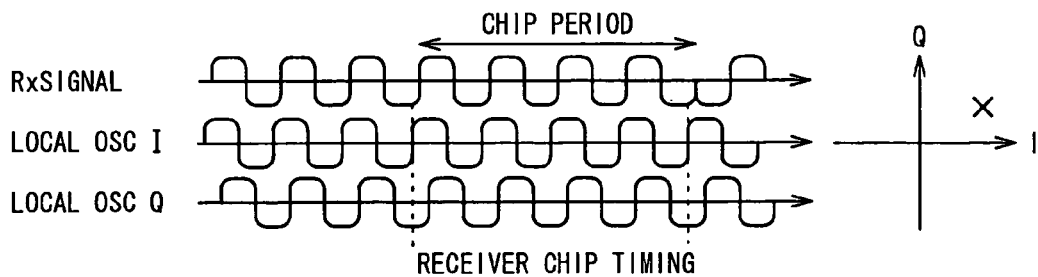
FIGS. 28A to 28D show how to digitally correct carrier phases.
Figure 28B:
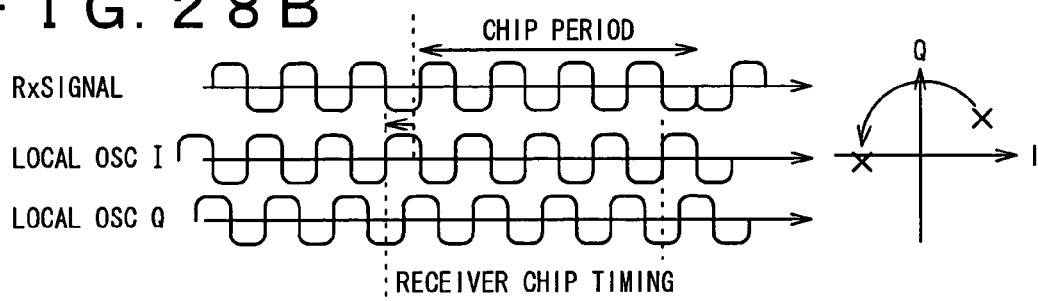
Figure 28C:
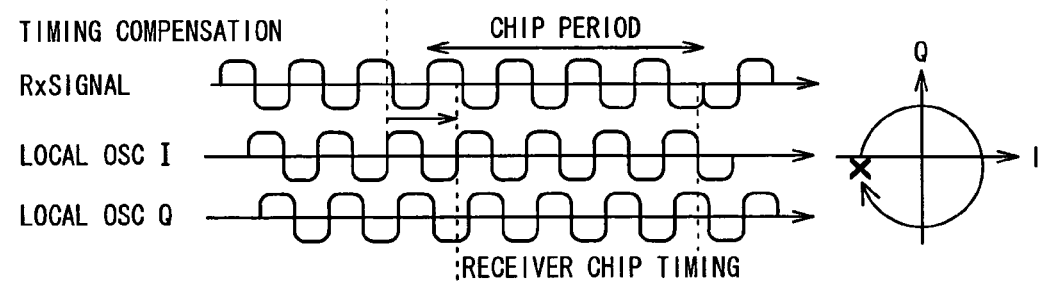

If the receiving side provides a fast frequency, the phase deviates in the plus direction with the lapse of time. If the phase deviates +180 [deg] or more, the chip timing is returned −250 picoseconds. Specifically, as shown in the examples in FIGS. 28A to 28D, we can observe that the phase deviates from state FIGS. 28A to 28B in the plus direction. In this case, the phase can be corrected by only once changing the 4 GHz division to ⅕ as shown in FIG. 28C. In this manner, the carrier phase is moved backward up to −180 [deg]. From this point, the phase deviation returns to 0 [deg] along the direction with the lapse of time.

Figure 28D:
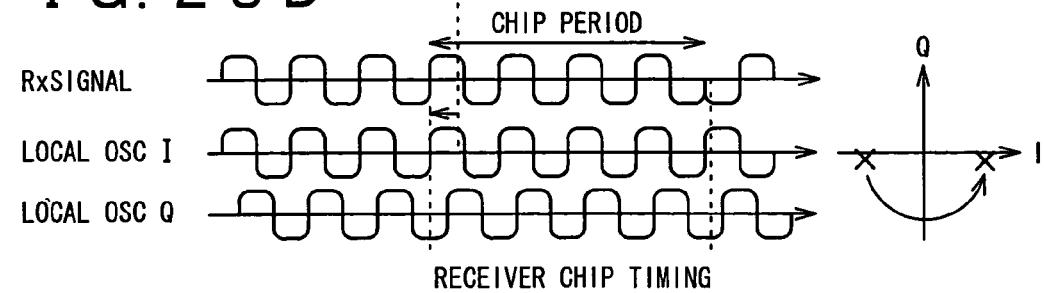

By contrast, if the receiving side provides a slow frequency, the phase deviates in the minus direction with the lapse of time. If the phase deviates +180 [deg] or more, the chip timing is returned +250 picoseconds. In this case, the phase can be corrected by only once changing the 4 GHz division to ⅓ as shown in FIG. 28D. In this manner, the carrier phase is moved backward up to +180 [deg]. From this point, the phase deviation returns to 0 [deg] along the direction with the lapse of time.

When the carrier phase is corrected by shifting the chip timing forward and backward like this method, the pulse position is allowed to deviate up to ±125 picoseconds in the worst case. Since the pulse length is 1000 picoseconds, it is considered that such deviation causes slight deterioration. The following describes how to provide finer correction to further decrease deterioration.

Figure 29:
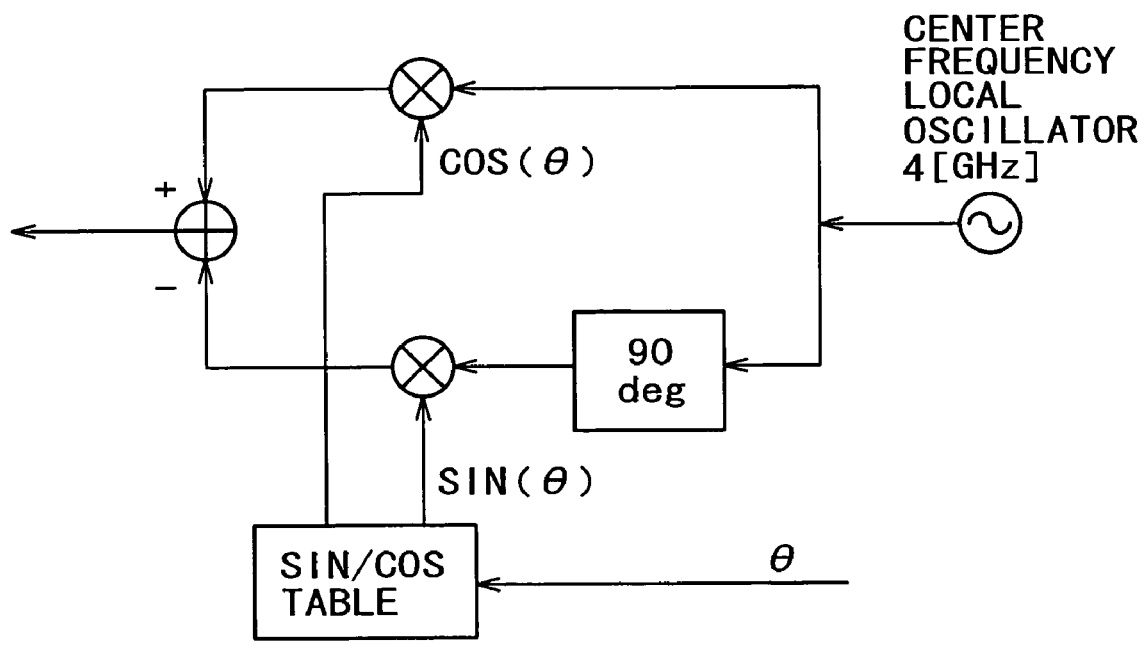
FIG. 29 shows a configuration of a circuit to shift pulse phases with fine resolution.

FIG. 29 shows the configuration of a circuit to shift pulse phases with fine resolution. The circuit in FIG. 29 can control phases of 250 picoseconds or less using the following cosine theorem.

$$\text{COS}(A+B)=\text{COS}(A)\text{COS}(B)-\text{SIN}(A)\text{SIN}(B)$$

A sine/cosine table is referenced for detected pulse phase θ to find SIN(θ) and COS(θ). These values are input to phase conversion circuits each comprising a multiplier. The 4 GHz center frequency output from the oscillator is input to the phase conversion circuits for sine and cosine with a phase difference of 90 degrees. A difference between the phase conversion circuits is obtained.

When the oscillator is controlled as VCO, phases can be controlled in an analog fashion, i.e., continuously. However, it is difficult to obtain a definitive phase shift amount under feed-forward control.

Figure 30:
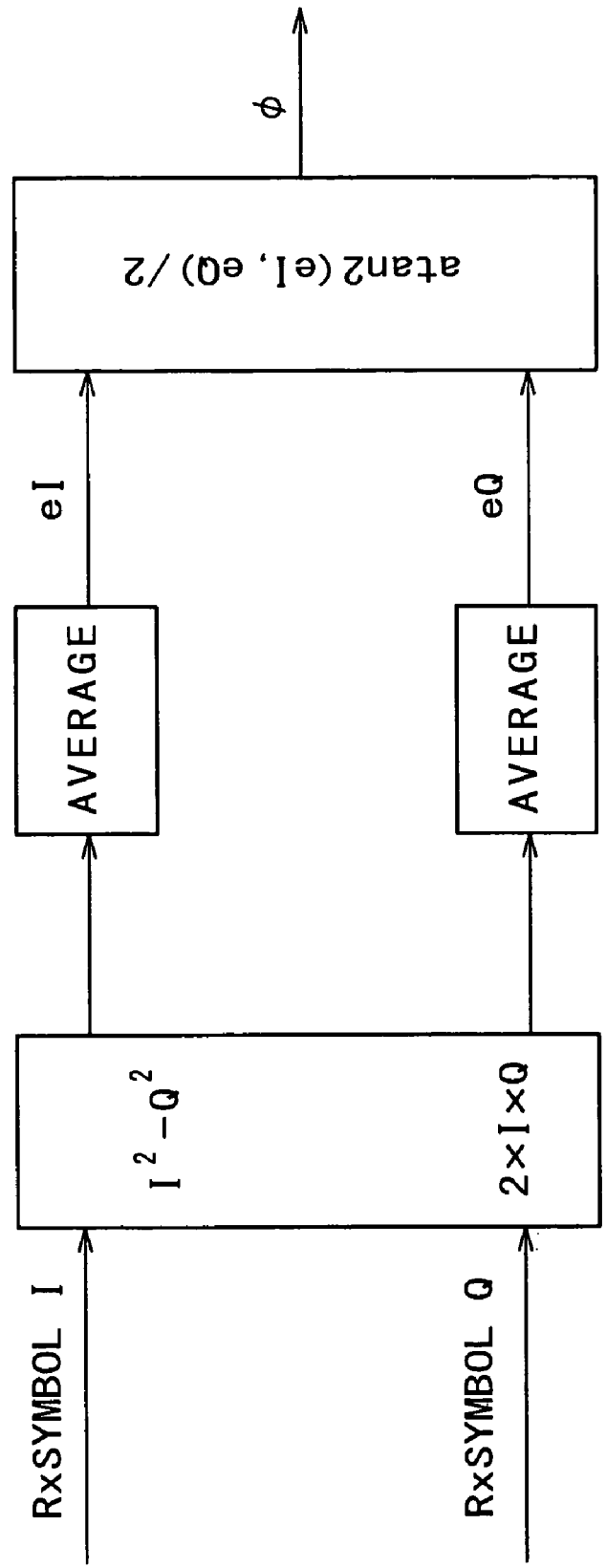
FIG. 30 shows a configuration of a circuit to detect a chip timing phase error.

Since the communication system according to the embodiment complies with BPSK (Binary Phase Shift Keying), a circuit as shown in FIG. 30 can be used to detect a chip timing phase difference.

Figure 31:
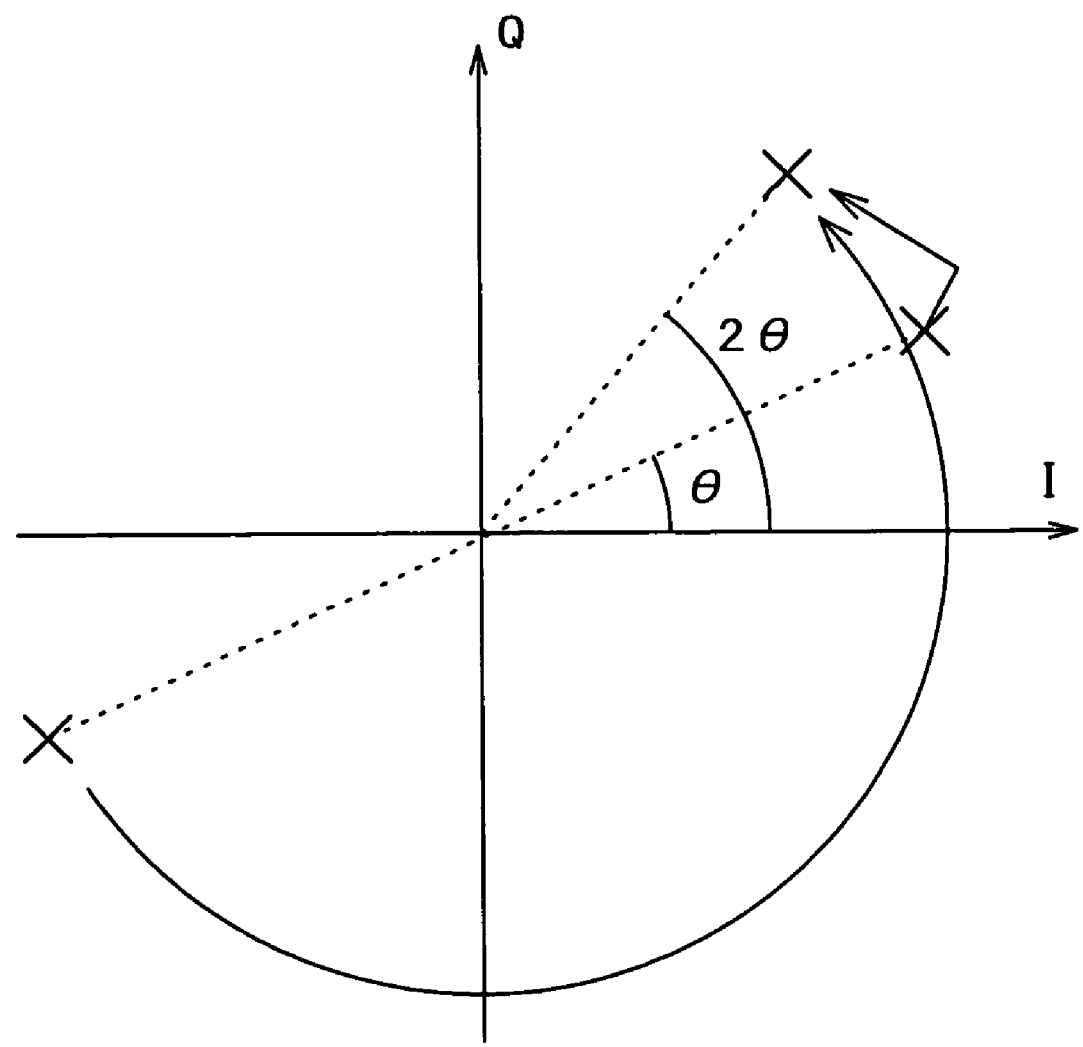
FIG. 31 illustrates how to find squares of complex numbers I and Q and remove uncertainty from BPSK data.

Here, a phase error is assumed to be φ. Finding a square of complex numbers I and Q can remove uncertainty from the BPSK data. That is to say, angle φ is found by raising I+jQ to the second power, averaging values of $I^2+Q^2+2I\times Q$, and halving the angle of deviation. The result is a 2φ phase point as shown in FIG. 31. At this point, an average is taken for improving the S/N ratio. Then, angle φ is found by calculating the phase and halving the result.

Figure 32:
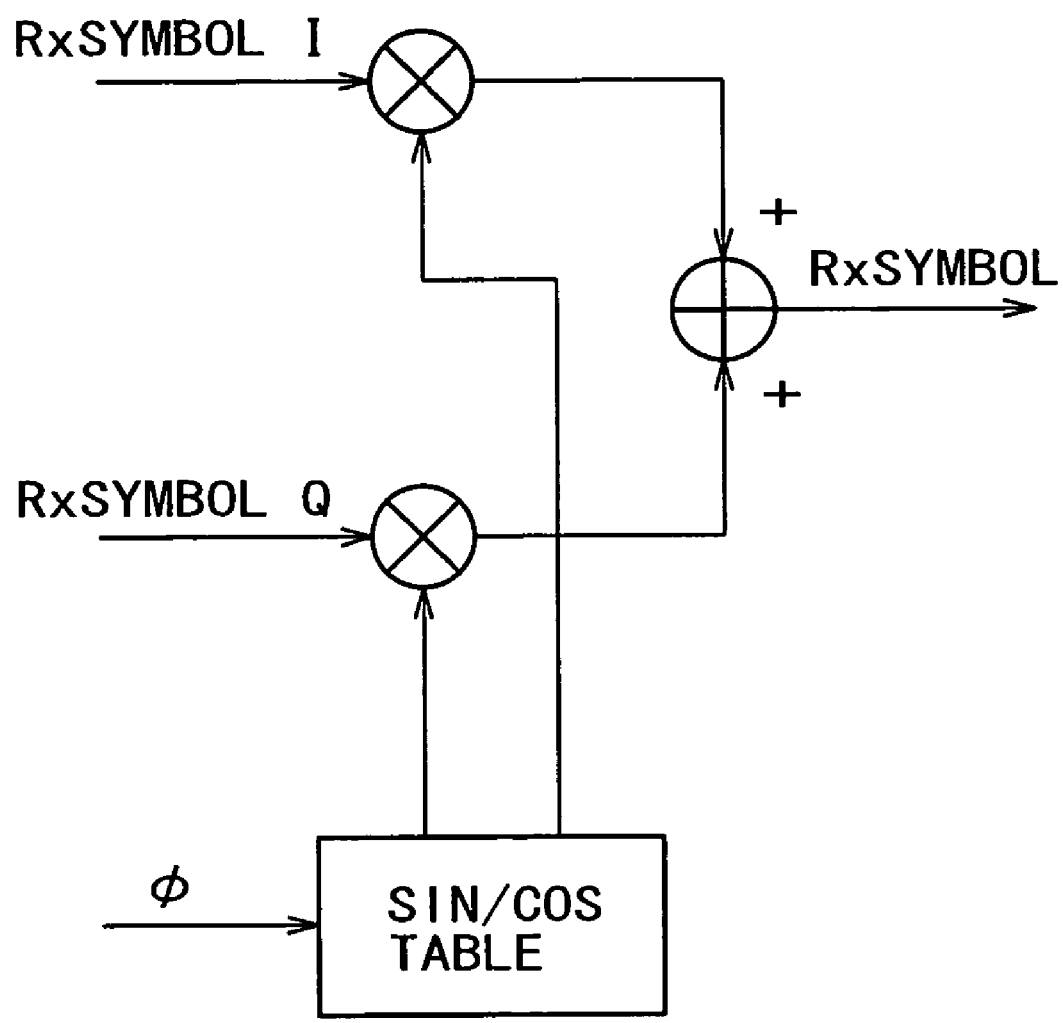
FIG. 32 shows a configuration of a phase rotation circuit.

After phase error φ is found, a phase rotation circuit as shown in FIG. 32 can be used to digitally compensate chip timing phases.

The sine/cosine table is referenced for chip timing phase error φ detected by the phase error detection circuit in FIG. 30 to find SIN(φ) and COS(φ). These values are input to phase conversion circuits each comprising a multiplier. The input values are multiplied by reception symbol's I and Q components. These values are added to retrieve the reception symbol.

D. Application to RAKE Reception

Now, we can point out multipath fading as one of problems in transmitting and receiving wireless signals. This phenomenon occurs as follows. A radio wave reflects on buildings and the other objects and reaches the receiving side via different paths. Radio waves coming from different directions interfere with each other to disturb the received signal.

The RAKE reception signifies reception of a plurality of radio waves. The despread process separates an intended signal from the received signal comprising a plurality of delay waves superposed by a multipath transmission channel. Dispersed signal powers are unified. Since the direct sequence spread spectrum provides an effect of disassembling the time by means of the despread, this effect is used to combine signals along separated paths by aligning the time and the phase. For example, weights are supplied in accordance with the paths' S/N ratios for maximum ratio combining. The RAKE reception makes it possible to effectively combine chronologically dispersed signal powers into an intended result.

Figure 33:
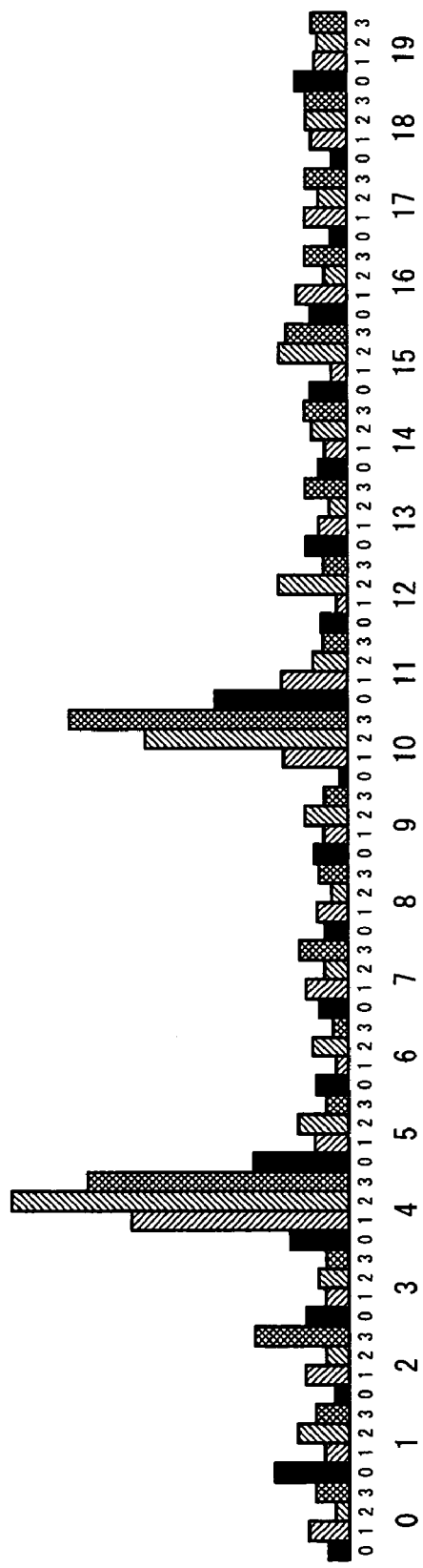
FIG. 33 shows transmission characteristics measured under a multipath environment.

FIG. 33 shows transmission characteristics obtained by the above-mentioned coherent channel measurement under a multipath environment.

The example in FIG. 33 reveals that there are two paths at 4-2 and 10-3 with an interval of 6250 picoseconds. These paths can be RAKE-combined because their amplitudes and phases are known.

The above-mentioned coherent channel measuring section (see FIG. 18) is configured to have four despread blocks for accelerating the measurement. The apparatus configuration shown in FIG. 15 A/D-converts a received signal based on one giga-sample per second for one set of I/Q. Paths with different chip phases cannot be RAKE-combined. That is to say, only paths with the same chip phase are combined. Therefore, the example in FIG. 33 combines only paths at the timings 4-2 and 10-2.

To combine paths with different chip phases, it is necessary to use a plurality of A/D converters and perform A/D conversion with different chip timings.

Figure 34:
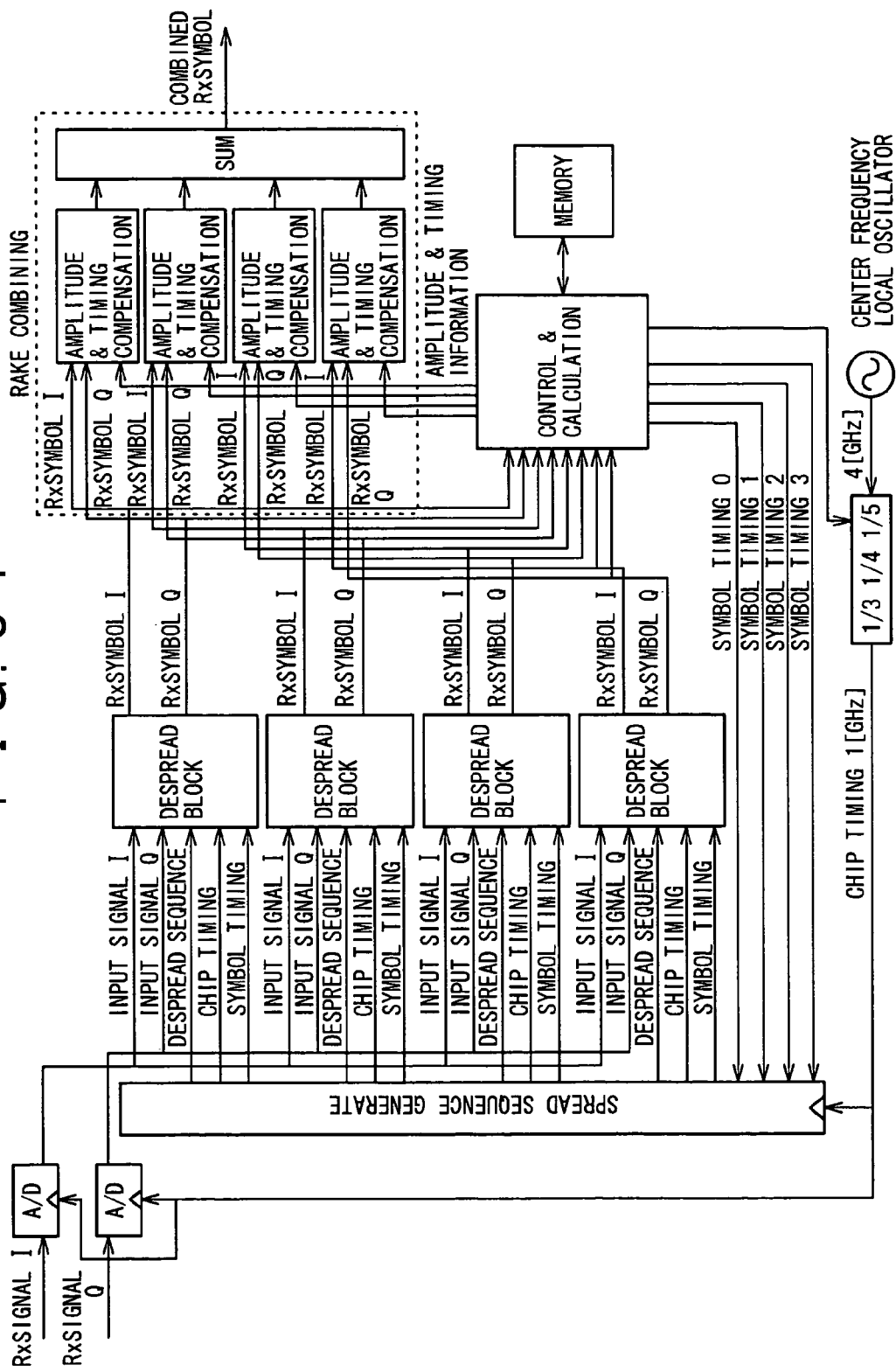
FIG. 34 shows a device configuration of the coherent channel measuring section combined with RAKE reception.

FIG. 34 shows a device configuration of the coherent channel measuring section combined with RAKE reception.

As shown in FIG. 34, the coherent channel measuring section comprises a divider circuit and a spread code generation section (Spread Code Generation). The divider circuit divides the 4 GHz center frequency to generate a chip timing. The spread code generation section generates a spread code based on the chip timing. The spread code generation section comprises a control section (Control & Calculation) and despread blocks (Despread Block). The despread block despreads a digitally processed received signal. In addition, there is provided a RAKE reception processing section (RAKE Combining).

Like the apparatus configuration in FIG. 18, there is provided four despread blocks for fast measurement. The RAKE reception processing section is provided with four AMP & timing compensation sections (AMP & Timing Compensation) corresponding to the four despread blocks. Outputs from these sections are RAKE-combined (SUM).

The control section specifies multipath timings obtained by the coherent channel measurement for the spread code generation section and the despread blocks.

The spread code generation section generates a short code comprising 20 chips at four types of timings according to a command from the control section (see the above-mentioned description and FIG. 20). The short codes are deviated at the same timing. In addition, the spread code generation section passes a short code spread sequence together with the symbol timing to each despread block. Each despread block uses this signal for despread.

The despread signal is supplied to the corresponding AMP & timing compensation section.

The control section provides each AMP & timing compensation section with a (complex) amplitude and a delay value of the transmission channel corresponding to each path.

Figure 35:
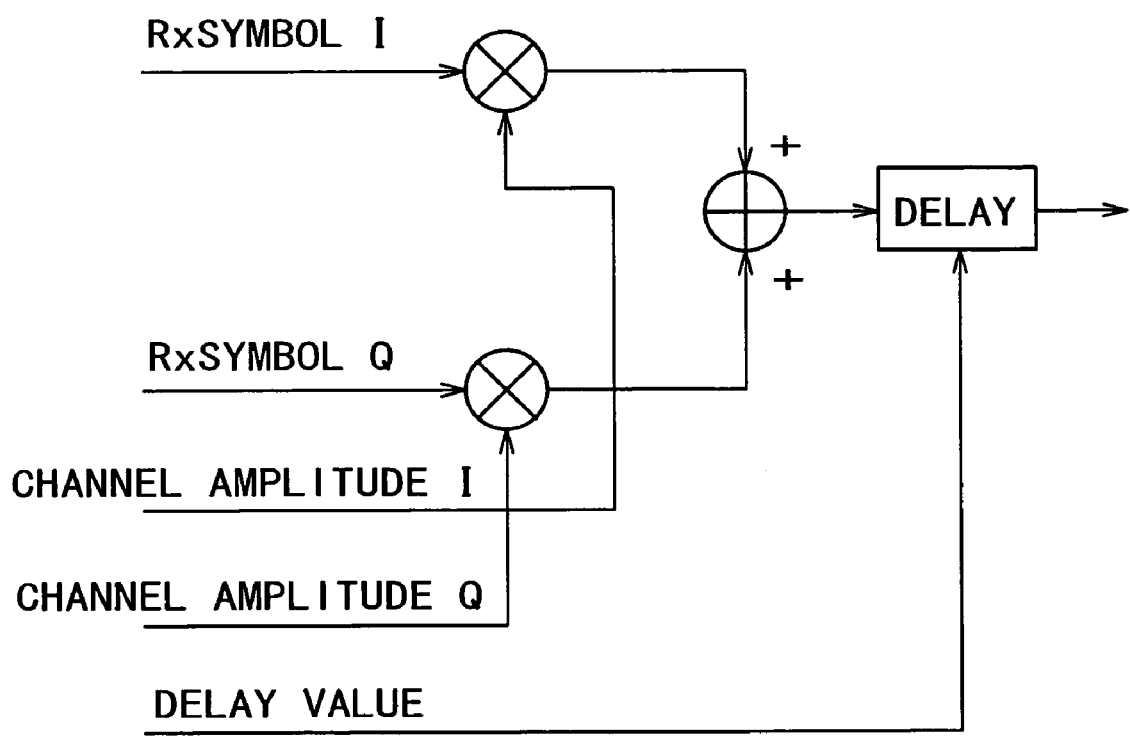
FIG. 35 shows a configuration of an AMP & timing compensation section.

FIG. 35 shows a configuration of the AMP & timing compensation section. To perform maximum ratio combining, the AMP & timing compensation section performs a (complex) multiplication for the input signal, and adjusts the amplitude, phase, and timing. Only a real part needs to be output because the example uses BPSK.

A combining section (SUM) adds outputs from the AMP & timing compensation sections to complete the RAKE reception.

E. Link Adaptation

The direct sequence spread spectrum communication according to the present invention can realize various bit rates by changing spread rates.

If a noise level or an interference level is smaller than the signal level, the spread rate can be decreased to increase the bit rate. Otherwise, the spread rate can be increased to decrease the bit rate. The above-mentioned embodiment according to the present invention is capable of variations as shown in the following table. In Table 1, spread rate 1 is equivalent to no spread.

TABLE 1

| Spread ratio | Bit rate (symbol rate) |
|---|---|
| 1 | 1 [Gbps] |
| 2 | 500 [Mbps] |
| 3 | 333 [Mbps] |
| . | . |
| . | . |
| . | . |
| 10 | 100 [Mbps] |
| . | . |
| . | . |
| . | . |
| 20 | 50 [Mbps] |
| . | . |
| . | . |
| . | . |

Different coding methods provide variations of necessary SINRs (Signal-to-Interference and Noise Ratios) and bit rates.

Performing the above-mentioned coherent channel measurement can reveal transmission channel's state. Independently of whether the above-mentioned RAKE reception is performed, it is possible to know not only a signal level, but also a noise level and an interference level of the communication.

Figure 36:
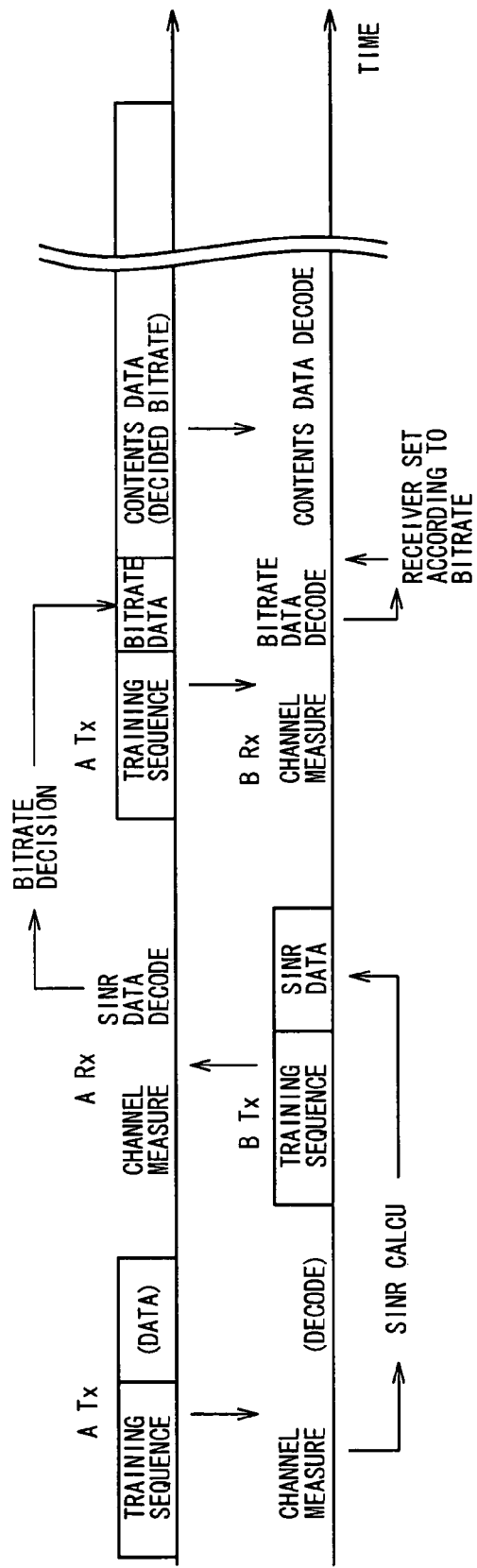
FIG. 36 shows a link adaptation process based on SINR estimated at the receiving side based on a result of coherent channel measure at the receiving side.

With reference to FIG. 36, the link adaptation will now be described in a case where user A transmits information to user B.

(1) Before transmission of net information from user A to user B, user A transmits a training sequence to user B. User B uses the training sequence to measure the SINR.

(2) User B transmits the measurement result to user A. When receiving the SINR, user A determines the bit rate, spread rate, and encoding method for transmission of the net information from user A to user B.

(3) This bit rate is used to transmit the net information from user A to user B.

Figure 37:
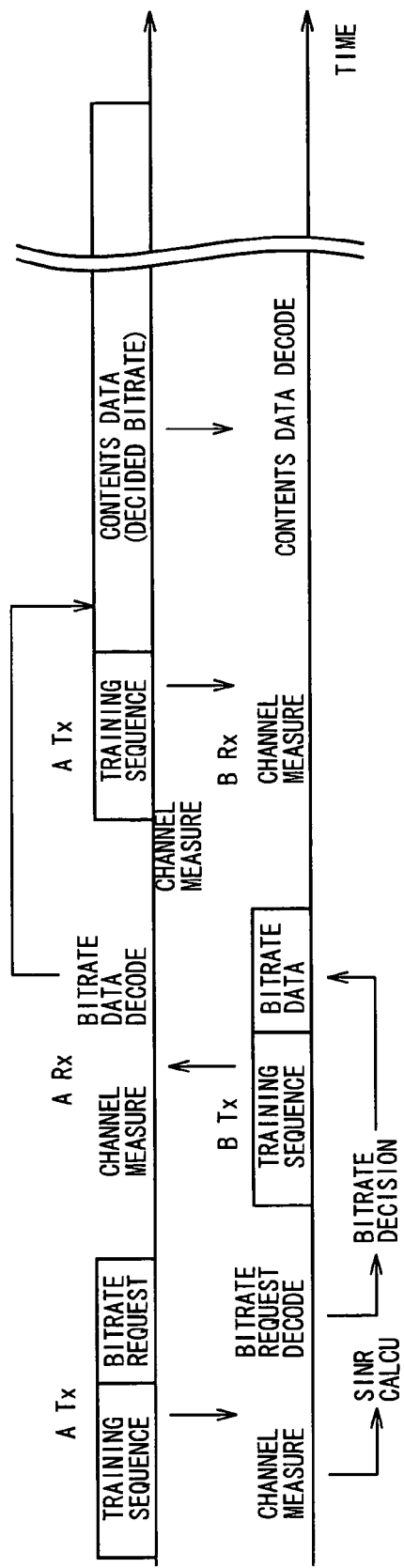
FIG. 37 shows a link adaptation process based on SINR estimated at the receiving side based on a result of coherent channel measure at the receiving side.

Alternatively, user B may not only measure the SINR based on the result of the coherent channel measurement, but also determine the bit rate, spread rate, encoding method, etc. based on the SINR and return them to user A. The procedure in this case will be described with reference to FIG. 37.

(1) Before transmission of net information from user A to user B, user A transmits a training sequence to user B. User B uses the training sequence to measure the SINR.

(2) Based on the measured SINR, user B determines the bit rate, spread rate, and encoding method for transmission of the net information from user A to user B. User B then transmits the determined contents to user A.

(3) This bit rate is used to transmit the net information from user A to user B.

For example, let us consider an RTS/CTS process according to the autonomous decentralized network system such as CSMA/CA with RTS/CTS (Request to Send/Clear to Send). Prior to transmission of the net information, user A as a transmission node transmits RTS. If user B as a reception node receives RTS and is ready for receiving data, user B returns CTS as a response. If user A can receive CTS, user A communicates with user B subsequently.

Messages for RTS and CTS are transmitted in a bursty fashion. Accordingly, the above-mentioned embodiment can install the link adaptation by adding the training sequence to the burst.

F. A/D Converter

The apparatus configuration for the coherent channel measurement according to the embodiment performs quadrature detection for a received signal using a carrier with the same frequency as for the transmission. The detected received signal contains values I (R×Signal I) and Q (R×Signal Q). These values are used for input and are submitted to the digital processing thereafter.

The A/D converter to be used requires a 1 GHz sampling rate. This speed makes it difficult to implement A/D conversion of many bits. To solve this problem, we consider the use of A/D converters for a small number of bits including a 1-bit A/D converter.

Figure 38:
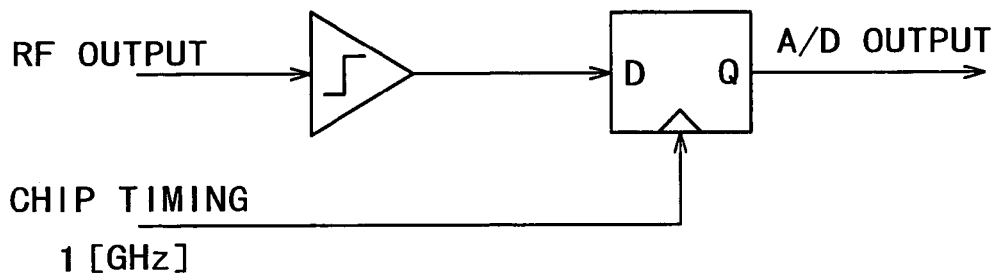
FIG. 38 exemplifies a circuit configuration of 1-bit A/D converter.

FIG. 38 exemplifies a circuit configuration of 1-bit A/D converter. An analog output signal from an RF reception section is input to an amplifier. When the signal level exceeds a specified value, the signal is output to a D latch. The D latch outputs this input signal as an A/D signal in synchronization with the 1 GHz chip timing.

Figure 39:
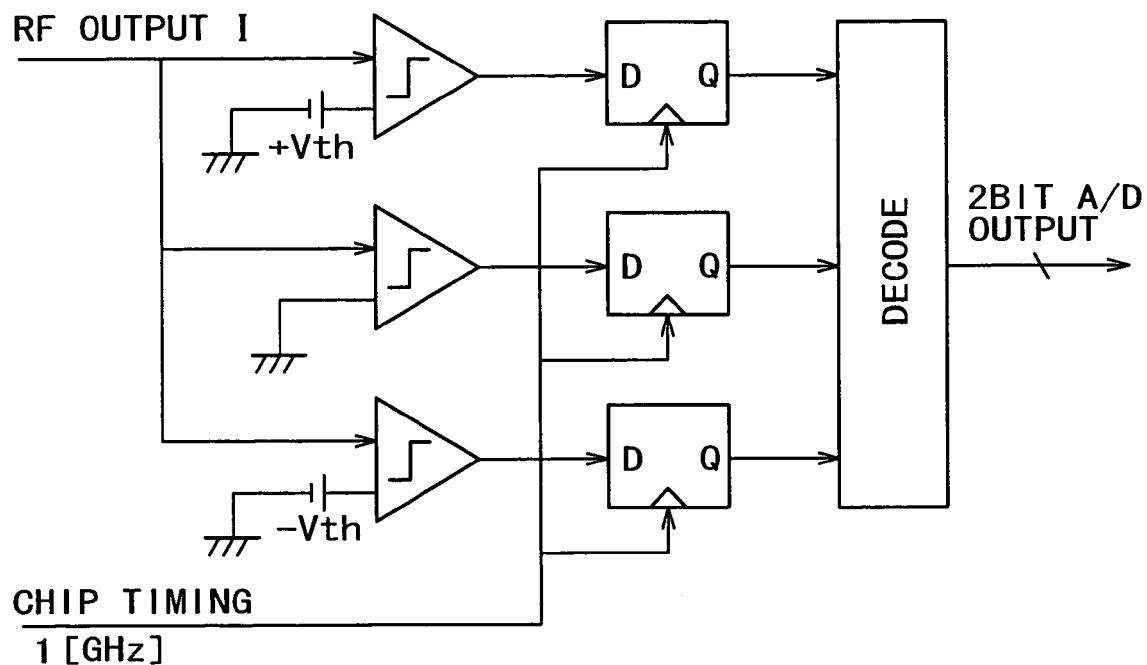
FIG. 39 exemplifies a circuit configuration of 2-bit A/D converter.

FIG. 39 exemplifies a circuit configuration of 2-bit A/D converter. An analog output signal from the RF reception section is input to amplifiers that perform differential amplification with reference to potentials $+V_{th}$, ground, and $-V_{th}$. When each potential difference exceeds a specified value, the signal is input to the corresponding D latch. Each D latch outputs the input signal in synchronization with the 1 GHz chip timing. A decoder decodes these outputs to output a 2-bit A/D signal.

The UWB communication according to the embodiment is combined with the direct sequence spread spectrum. Even if the 1-bit A/D conversion is performed, a resolution of several bits can be obtained after the despread.

In particular, the A/D conversion for a small number of bits may be subject to insufficient resolution for the transmission at a decreased spread rate and an increased bit rate. Basically, the quadrature detection is performed for the received signal to obtain the I and Q components that are then A/D-converted at the chip timing to be used as input signals. Further, it may be preferable to mutually add and subtract the I and Q components in an analog fashion, apply a 45-degree rotation, and then perform the A/D conversion to create signals I' and Q'. These may be used as input signals. FIG. 40 exemplifies a circuit configuration of an A/D converter to detect eight phases. This circuit can be used as an A/D converter having the 8-phase resolution for phase tracking and demodulation.

As can be seen from the result of A/D conversion for four signals in FIG. 40, the 1-bit A/D converter can be used for quantization in eight phase directions. Even a high-speed transmission can increase the phase correction resolution.

[Supplement]

There have been described specific preferred embodiments of the present invention. It is further understood by those skilled in the art that various changes and modifications may be made in the embodiments without departing from the spirit and scope thereof. That is to say, the present invention has been disclosed in the form of exemplification. The contents of the specification should not be interpreted restrictively. To understand a subject matter of the present invention, the appended claims should be taken into consideration.

[Effects of the Invention]

As mentioned above, the present invention can provide the excellent communication apparatus and communication method capable of high-speed transmission channel estimation by means of the UWB transmission in combination with the direct sequence spread spectrum.

Further, the present invention can fast detect symbol or pulse positions by means of the high-speed transmission channel estimation. This enables operations such as CSMA equivalent to the carrier sense that is originally difficult for the UWB communication to implement. It becomes possible to use multiple access systems such as CSMA.

Further, it is possible to grasp a multipath situation using a result of the coherent channel measurement according to the present invention and to obtain parameters needed to RAKE-receive signals via a plurality of paths based on the multipath situation. For example, paths with different chip phases cannot be RAKE-combined. Accordingly, it is possible to obtain a multipath timing based on the result of measuring the transmission channels and combine only paths with the same chip phase. The RAKE reception makes it possible to effectively combine chronologically dispersed signal powers in to an intended result. Since the direct sequence spread spectrum provides an effect of disassembling the time by means of the despread, this effect is used to combine signals along separated paths by aligning the time and the phase.

Moreover, the SINR can be estimated based on the final measured value from the coherent channel measurement according to the present invention. The estimated SINR can be used to realize the highly accurate link adaptation.

The present invention changes a carrier division ratio for obtaining chip timings to correct received pulse positions. In this manner, a stable reception circuit can be configured.

In addition to I and Q components that are basically obtained through the quadrature detection of a received signal, the present invention adds and subtracts outputs from the I and Q components in an analog fashion, applies a 45-degree phase rotation to the results, and A/D-converts them. In this manner, even an A/D converter having a small number of bits is capable of excellent phase tracking, improving a demodulation result.

What is claimed is:

1. A communication apparatus performing ultra wide band communication comprising:
    an RF reception processing section which uses a transmission band center as a carrier frequency and receives an input signal comprising a pulse obtained by using the carrier frequency to modulate a baseband pulse generated at a chip rate equivalent to an integral division of the carrier frequency; and
    a coherent channel measuring section which provides a training section based on short code spread with a same pattern repeated for each symbol length and performs coherent channel measurement of a transmission channel by using the training section to specify a length of the short code to be a measurement period and using N cycles of a carrier as a time resolution for measurement.

2. The communication apparatus according to claim 1, wherein the coherent channel measuring section controls a chip timing at the time resolution for measurement and, at all points given by a time resolution for a measurement period, obtains a measured value by using the short code to despread A/D-converted values from an input signal based on the chip timing.

3. The communication apparatus according to claim 2, wherein the coherent channel measuring section has a plurality of despread blocks and provides each despread block with a different despread timing.

4. The communication apparatus according to claim 2, wherein the coherent channel measuring section performs a plurality of measurement processes to obtain measured values by using the short code to despread A/D-converted values from an input signal based on the chip timing and adds the measured values cumulatively or intermittently at each point on a complex-number basis.

5. The communication apparatus according to claim 4, wherein the coherent channel measuring section detects a pulse position at which a largest energy is found out of the measured values cumulatively or intermittently added at respective points on a complex-number basis.

6. The communication apparatus according to claim 4, wherein the coherent channel measuring section demodulates a reception symbol at a detected pulse position and correlates the demodulation result with a symbol pattern in the training section to detect a symbol position in the training section.

7. The communication apparatus according to claim 6, wherein the coherent channel measuring section determines a final coherent channel measurement value by removing an effect of the symbol pattern of the training section from a measured value at each point.

8. The communication apparatus according to claim 2, wherein the coherent channel measuring section uses a training pattern suffixed by its reverse to provide a double training length; and
    wherein the training pattern comprises a short code repeated for the specified number of symbols.

9. The communication apparatus according to claim 8, wherein the coherent channel measuring section performs a plurality of measurement processes to obtain a measured value by using the short code to despread A/D converted values from an input signal based on the chip timing and alternately adds or subtracts the measured value at each point.

10. The communication apparatus according to claim 2, wherein the coherent channel measuring section always stores measured values equivalent to past given points for the number of times needed for an average and takes a moving average for the number of times.

11. The communication apparatus according to claim 2, further comprising:
    a RAKE reception section which grasps a multipath situation based on a measurement result from the coherent channel measuring section and despreads to combine signals received via a plurality of paths based on the multipath situation.

12. The communication apparatus according to claim 11, wherein the coherent channel measuring section has a plurality of despread blocks and provides each despread block with a different despread timing;
    wherein the RAKE reception section comprises an AMP & timing compensation section corresponding to each despread block and a combining section to RAKE-combine outputs therefrom; and
    wherein each AMP & timing compensation section multiplies input signals based on a transmission channel's amplitude and delay value for a corresponding path and adjusts amplitudes, phases, and timings.

13. The communication apparatus according to claim 2, wherein the apparatus estimates an SINR (Signal-to-Interference and Noise Ratio) based on a final coherent channel measurement value in the coherent channel measuring section or estimates a transmittable bit rate from the estimated SINR and provides feedback to a transmission side to adaptively control a communication connection.

14. The communication apparatus according to claim 2, wherein the coherent channel measuring section detects a carrier phase deviation even during reception and tracks a pulse position by digitally compensating a phase when a detected carrier phase deviation is smaller than a specified phase difference and by changing a carrier division ratio for obtaining chip timings to correct received pulse positions when a detected carrier phase deviation is greater than the phase difference.

15. The communication apparatus according to claim 2, wherein the coherent channel measuring section A/D-converts I and Q components obtained by quadrature detection based on a chip timing and mutually adds and subtracts the I and Q components in an analog fashion, applies a 45-degree rotation, and then performs A/D conversion to detect eight phases.

16. A method of ultra wide band communication comprising the steps of:
performing an RF reception processing section which uses a transmission band center as a carrier frequency and receives an input signal comprising a pulse obtained by using the carrier frequency to modulate a baseband pulse generated at a chip rate equivalent to an integral division of the carrier frequency; and
performing a coherent channel measurement step which provides a training section based on short code spread with a same pattern repeated for each symbol length and performs coherent channel measurement of a transmission channel by using the training section to specify a length of the short code to be a measurement period and using N cycles of a carrier as a time resolution for measurement.

17. The communication method according to claim 16, wherein the coherent channel measurement controls a chip timing at the time resolution for measurement and, at all points given by a time resolution for a measurement period, obtains a measured value by using the short code to despread A/D converted values from an input signal based on the chip timing.

18. The communication method according to claim 17, wherein the coherent channel measurement performs a plurality of measurement processes to obtain a measured value by using the short code to despread A/D converted values from an input signal based on the chip timing and adds the measured value cumulatively or intermittently at each point on a complex-number basis;
wherein the coherent channel measurement detects a pulse position at which a largest energy is found out of the obtained measured values;
wherein the coherent channel measurement demodulates a reception symbol at a detected pulse position and correlates the demodulation result with a symbol pattern in the training section to detect a symbol position in the training section; and
wherein the coherent channel measurement determines a final coherent channel measurement value by removing an effect of the symbol pattern of the training section from a measured value at each point.

19. The communication method according to claim 17, wherein the coherent channel measurement uses a training pattern suffixed by its reverse to provide a double training length;
wherein the training pattern comprises a short code repeated for the specified number of symbols; and
wherein the coherent channel measurement performs a plurality of measurement processes to obtain a measured value by using the short code to despread A/D converted values from an input signal based on the chip timing and alternately adds or subtracts the measured value at each point.

20. The communication method according to claim 17, wherein the coherent channel measurement always stores measured values equivalent to past given points for the number of times needed for an average and takes a moving average for the number of times.

21. The communication method according to claim 17, comprising the steps of:
grasping a multipath situation based on a result from the coherent channel measurement; and
performing RAKE reception to receive signals via a plurality of paths based on the multipath situation.

22. The communication method according to claim 17, comprising the steps of:
estimating an SINR (Signal-to-Interference and Noise Ratio) based on a final coherent channel measurement value in the coherent channel measuring section or estimating a transmittable bit rate from the estimated SINR and;
providing feedback to a transmission side to adaptively control a communication connection.

23. The communication method according to claim 17, wherein the coherent channel measurement detects a carrier phase deviation even during reception and tracks a pulse position by digitally compensating a phase when a detected carrier phase deviation is smaller than a specified phase difference and by changing a carrier division ratio for obtaining chip timings to correct received pulse positions when a detected carrier phase deviation is greater than the phase difference.

24. The communication method according to claim 17, wherein the coherent channel measurement A/D-converts I and Q components obtained by quadrature detection based on a chip timing and mutually adds and subtracts the I and Q components in an analog fashion, applies a 45-degree rotation, and then performs A/D conversion to detect eight phases.

* * * * *